Sept. 28, 1926.
W. ASTLE
1,601,590
CONTROL VALVE FOR AIR BRAKE APPARATUS
Filed March 24, 1925       6 Sheets-Sheet 5
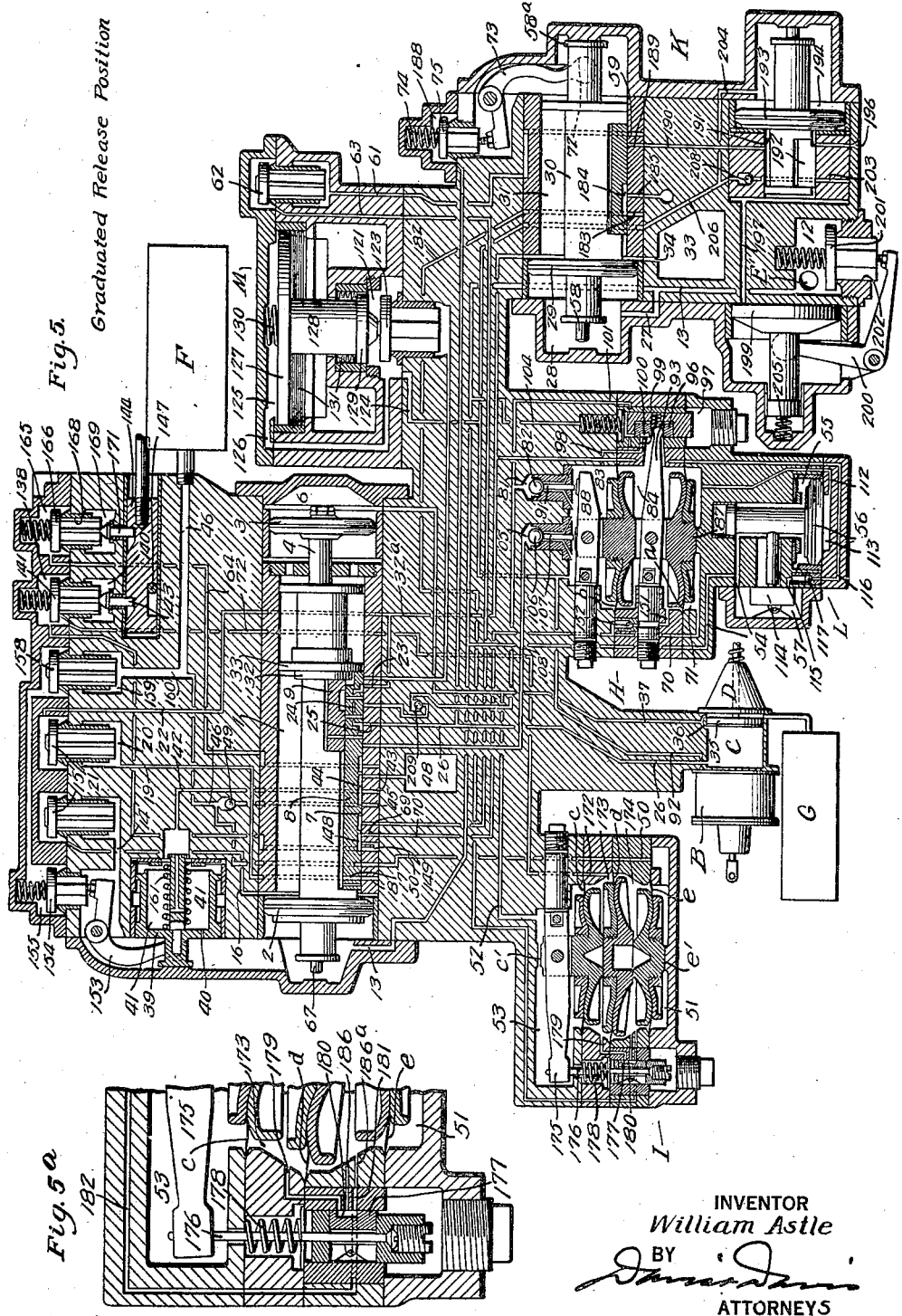
INVENTOR
*William Astle*
BY
ATTORNEYS Sept. 28, 1926.
W. ASTLE
1,601,590
CONTROL VALVE FOR AIR BRAKE APPARATUS
Filed March 24, 1926   6 Sheets-Sheet 6
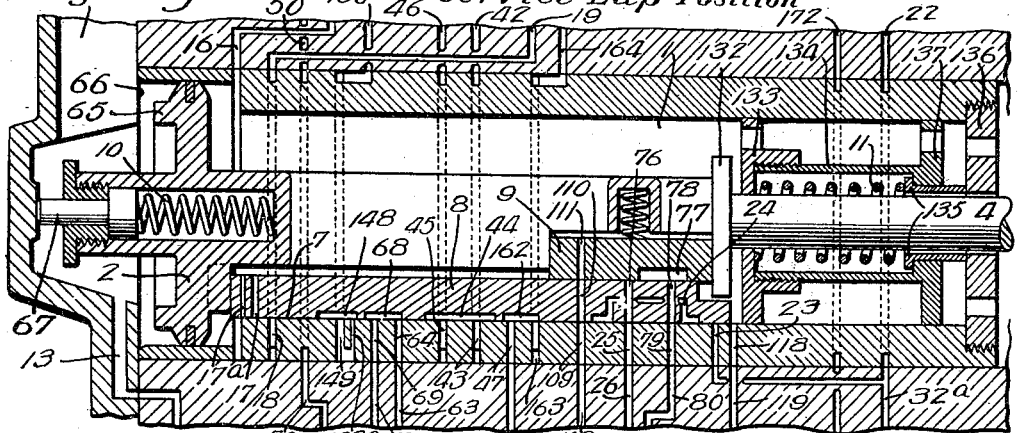
Fig.6.  Service Lap Position
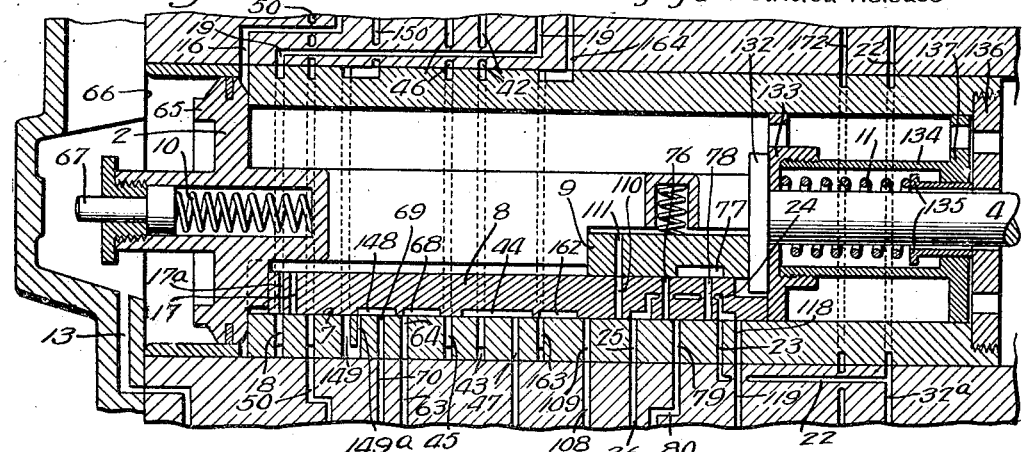
Fig.7.  Retarded Recharging & Restricted Release
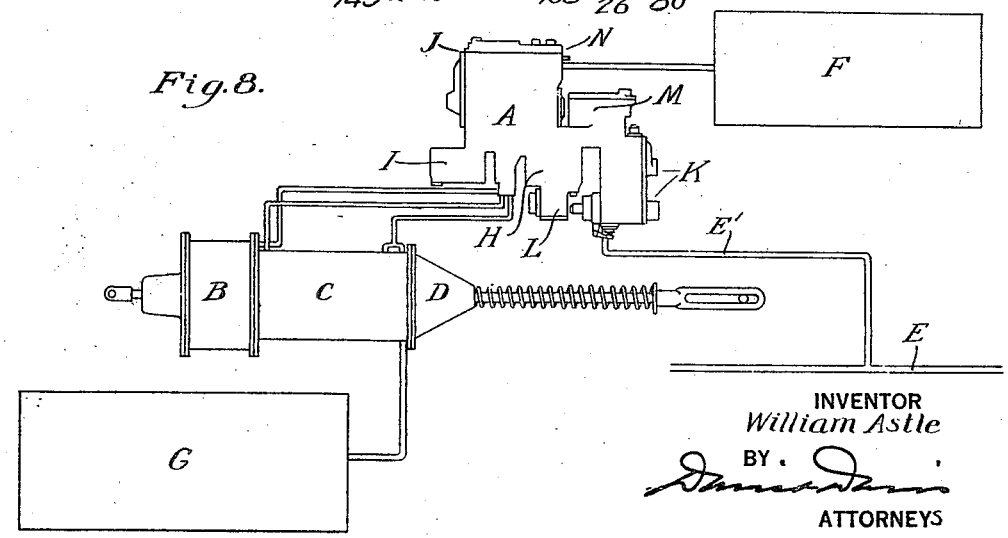
Fig.8.
INVENTOR
William Astle
BY
ATTORNEYS Patented Sept. 28, 1926.

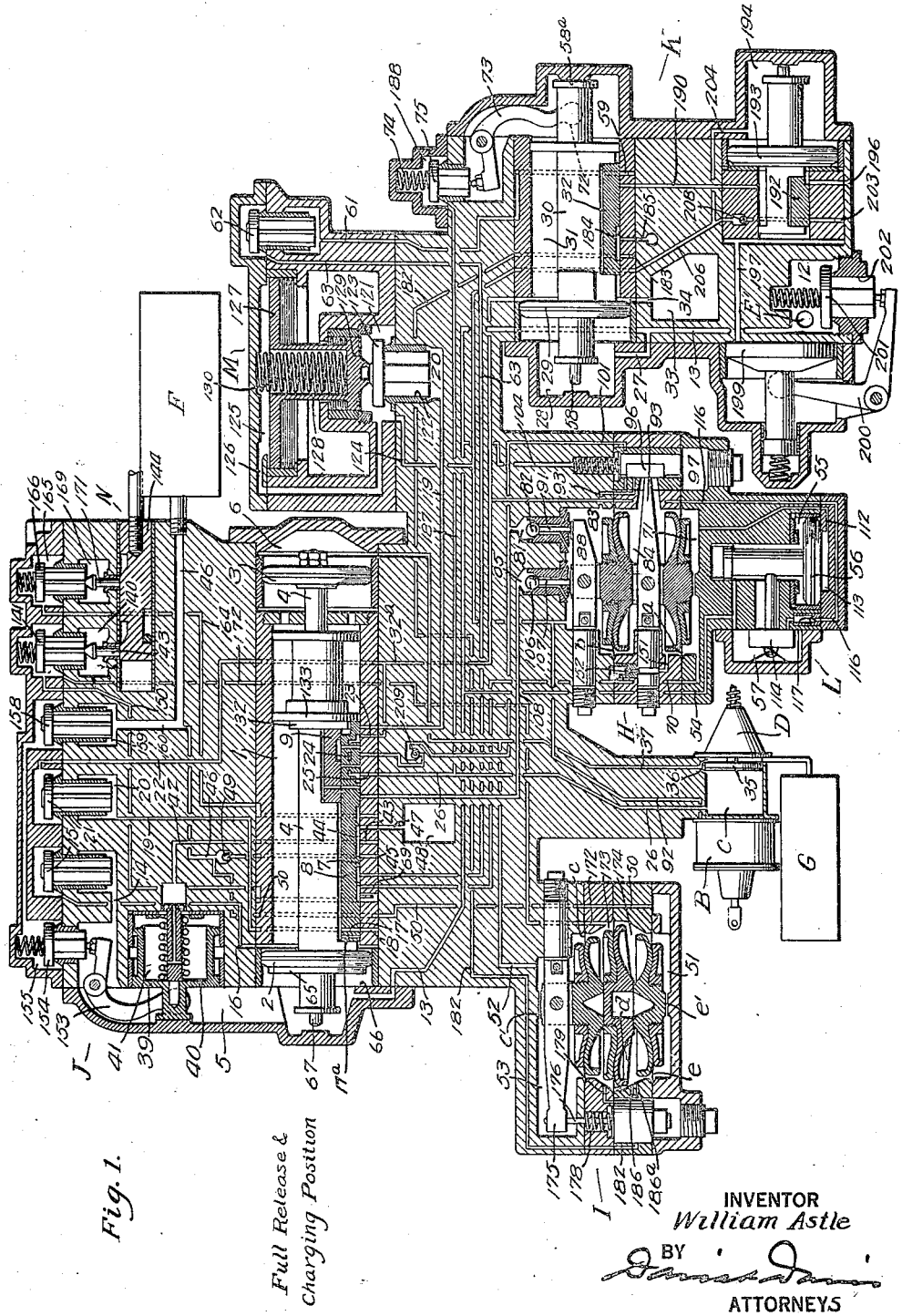

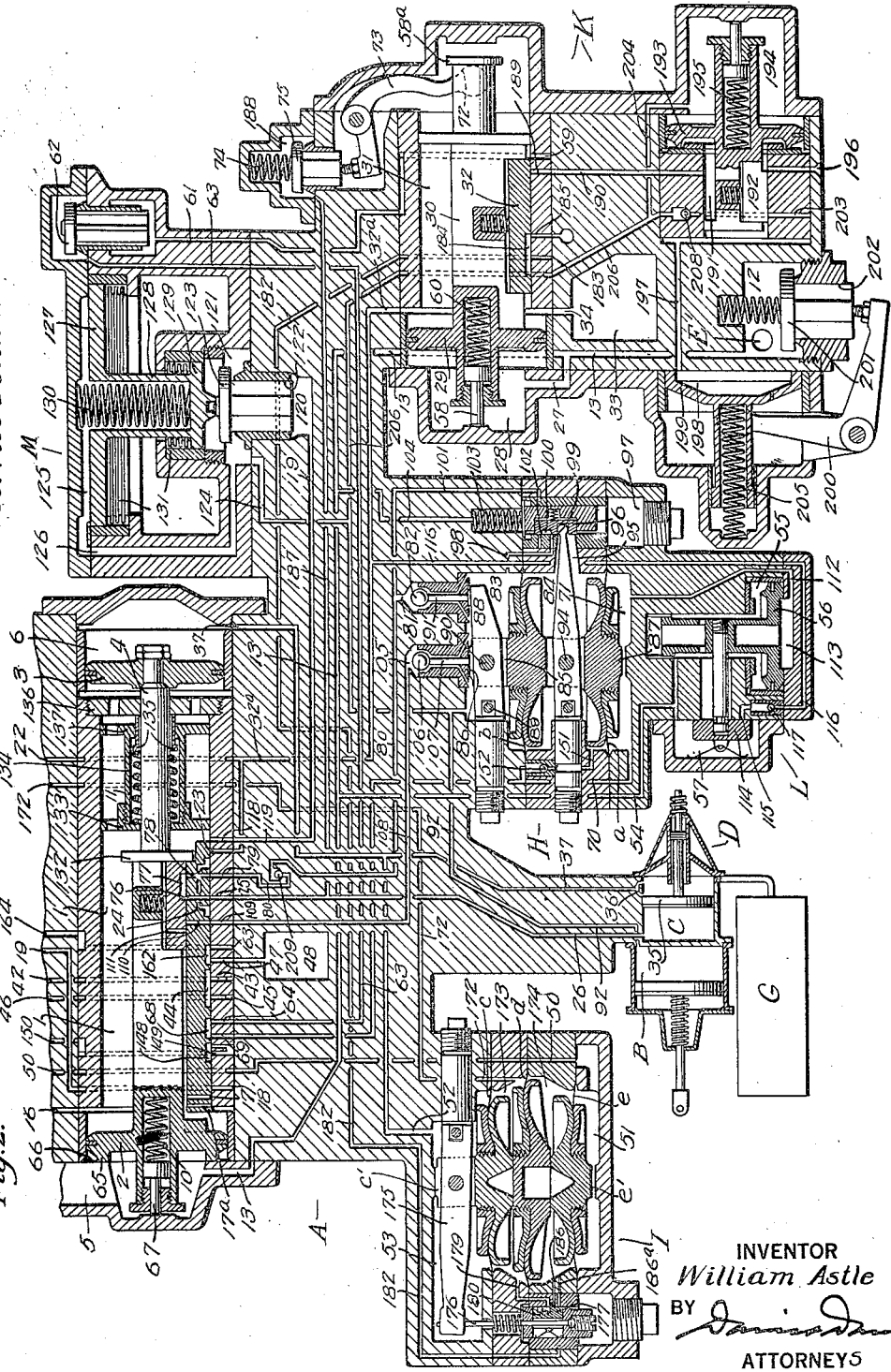

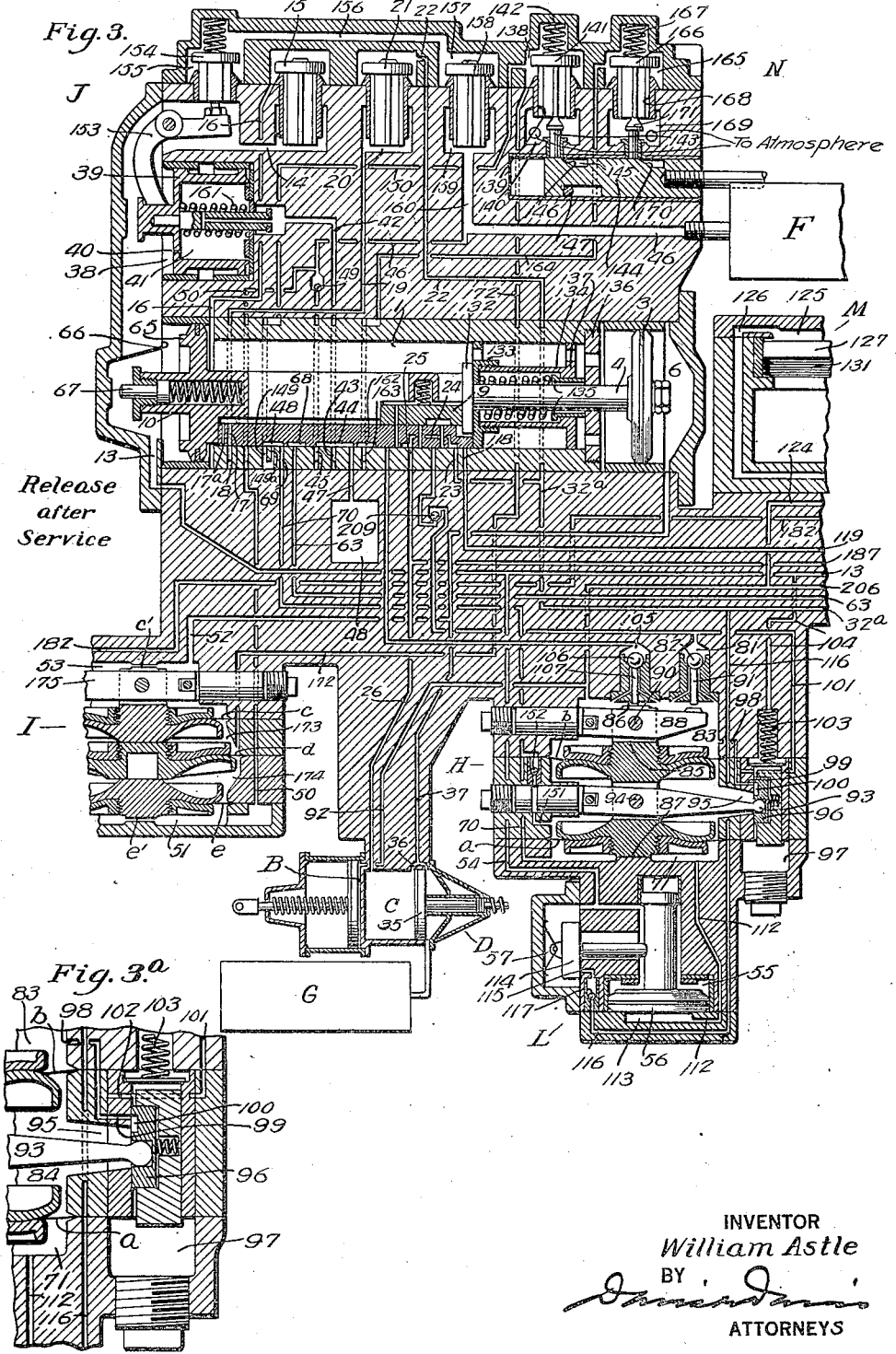

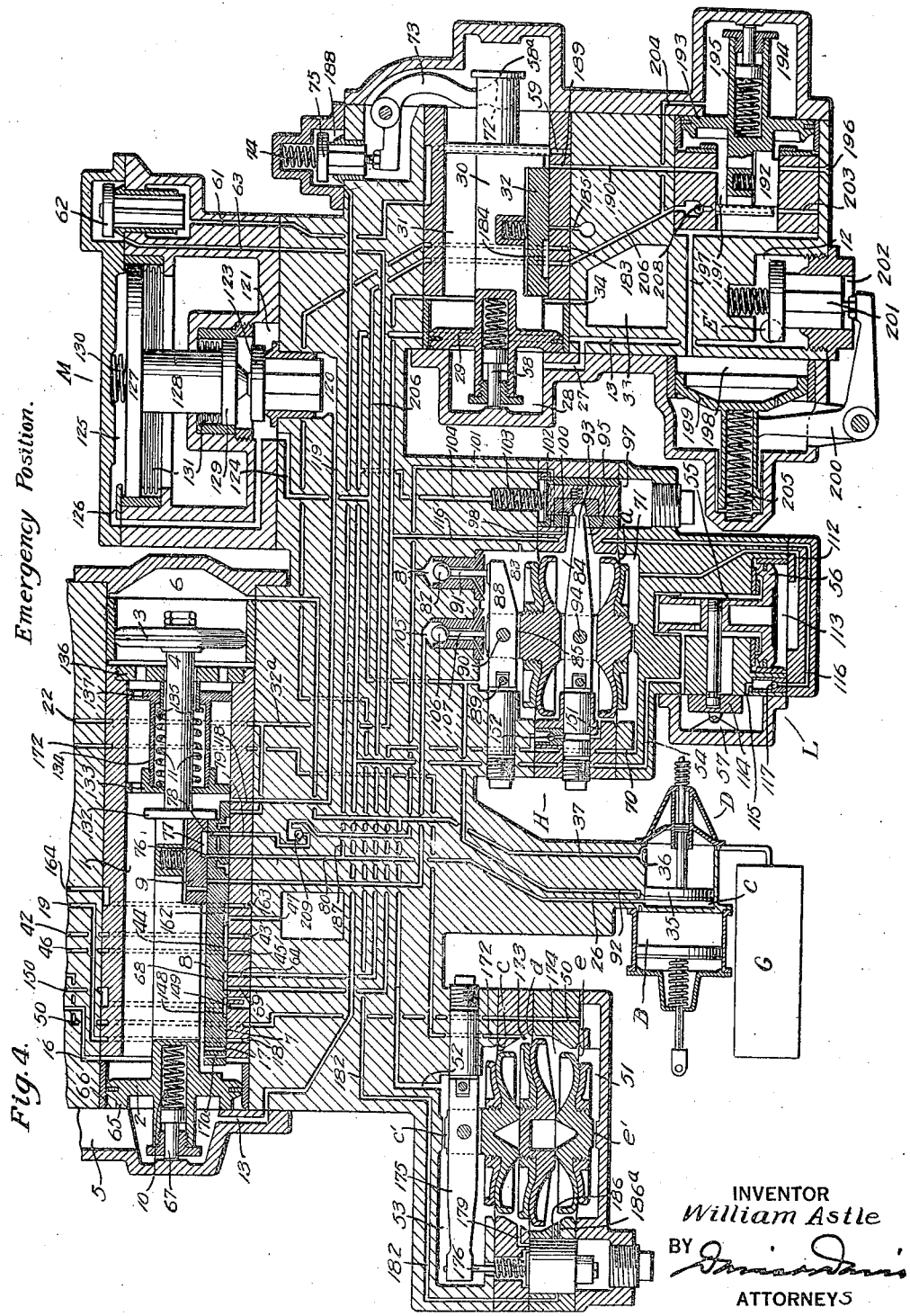

1,601,590

UNITED STATES PATENT OFFICE.

WILLIAM ASTLE, OF BROOKLYN, NEW YORK, ASSIGNOR TO AUTOMATIC STRAIGHT AIR BRAKE COMPANY, OF WILMINGTON, DELAWARE, A CORPORATION OF DELAWARE.

CONTROL VALVE FOR AIR-BRAKE APPARATUS.

Application filed March 24, 1926. Serial No. 97,015.

This invention relates to improvements in that type of air brake apparatus known as the Kunze-Knorr brake, in which a compound brake cylinder is employed. One of these cylinders is what is known as a single-chamber cylinder, and in which a brake piston operates, air under pressure being admitted to said cylinder through the control valve for an application of the brakes. The other cylinder is what is known as a double-chamber cylinder, the two chambers being separated by a movable abutment or piston. This piston is also connected to the brake-applying rigging or mechanism and comes into operation only in emergency applications of the brakes. One chamber of the double-chamber cylinder supplies air under pressure for service braking, said air passing into the single-chamber cylinder for service applications of the brakes. This chamber may be conveniently designated as the service chamber. The other chamber of the double-chamber cylinder contains air under pressure which is used in emergency applications of the brakes. This chamber may be conveniently designated as the emergency chamber.

The main object of this invention is to improve the compound brake cylinder type of air brake apparatus.

Other objects of the invention are:

1. To provide means for producing uniform brake cylinder pressure for a given brake pipe reduction regardless of the extent of the brake cylinder piston travel.

2. To provide means operating automatically to compensate for brake cylinder leakage so that a given brake cylinder pressure will be maintained.

3. To provide means whereby air will be taken from the brake pipe to compensate for brake cylinder leakage.

4. To provide means to prevent automatic emergency applications of the brakes when there has been an equalization of pressures in the service chamber and in the single-chamber brake cylinder.

5. To provide a quick-release reservoir and means whereby when the control valve is moved to release position air from the quick-release reservoir will flow to the brake pipe for a quick release of the brakes.

6. To provide a manually adjustable release-governing valve having a quick-release position and a graduated-release position, the said release-governing valve in its quick-release position co-operating with the main slide valve and the quick-release valve to secure a quick release of the brakes. The release-governing valve in its graduated-release position prevents the operation of the quick-release mechanism.

7. To provide a graduated-release valve operating to release brake cylinder pressure in direct proportion to the increase in brake pipe pressure.

8. To provide an application valve which is controlled in its operations by the opposed pressure of the brake cylinder and the pressure in a control chamber.

9. To provide an emergency valve and an emergency brake pipe vent valve operating only upon a sudden and prolonged reduction in brake pipe pressure.

10. To provide means whereby an excessive brake pipe pressure will move the main slide valve into retarded-recharging and restricted-release position.

11. To provide means for temporarily connecting the brake pipe to the brake cylinder, upon a reduction of brake pipe pressure for an application of the brakes, thereby securing a quick serial action of the control valves throughout the train.

There are other objects and advantages of the invention, all of which will appear hereinafter.

In the drawings:

Fig. 1 is a diagrammatic view of the control valve, showing the parts in full-release and charging position;

Fig. 2 a view similar to Fig. 1, showing the parts in service-application position;

Fig. 3 a diagrammatic view of a portion of a control valve, showing the parts in the position they assume in release after service;

Fig. 3ª a detail view of the release valve in release position;

Fig. 4 a view similar to Fig. 2, showing the parts in emergency position;

Fig. 5 a view similar to Fig. 1, showing the parts in graduated-release position;

Fig. 5ª a detail view of the graduated-release valve in release position;

Fig. 6 a diagrammatic view of a portion of the control valve, showing the parts in service lap position;

Fig. 7 a diagrammatic view similar to Fig. 6, showing the main slide valve in retarded-recharging and restricted-release position; and Fig. 8 a diagrammatic view of the control valve, its associated reservoirs and the brake pipe and brake cylinder.

In order to simplify the description of the control valve and its operations, the various parts and the ports and passages will not be specifically described except in connection with the description of the various operations of the valve.

In the diagrammatic view Fig. 8, A designates the control valve; B the single-chamber brake cylinder; C the service chamber; D the emergency chamber of the double-chamber cylinder; E the brake pipe; F the quick-release reservoir; and G the emergency reservoir which is in direct communication with the emergency chamber D.

In the control valve is formed a main valve chamber 1. In this chamber is arranged a main release piston 2 and a service piston 3. The release piston, as shown in the drawings, is at the left-hand end of the main valve chamber and the service piston is in the right-hand end of said chamber. These two pistons are rigidly connected together by a central valve stem 4 extending through the main valve chamber. The release piston operates in a main brake pipe chamber 5 and the service piston reciprocates in a chamber 6. The pistons 2 and 3 serve as movable abutments which separate the chambers 5 and 6 from the main valve chamber 1. In the main valve chamber is formed a main valve seat 7 on which slides the main slide valve 8, said valve being connected to the piston stem 4 with a slight lost motion sufficient to permit the graduating valve to move to lap position without moving the main slide valve. On top of the main slide valve is arranged a graduating valve 9, said valve being directly connected to the valve stem 4 and moving with it. A service lap spring 10 is arranged to be compressed when the main slide valve is moved to service position, said spring exerting its force to move the graduating valve to service lap position, as will be hereinafter described. Surrounding the piston rod 4 adjacent the service piston is a charging stop spring 11. This spring serves to stop the main and graduating valves in normal charging position and permits them to move to retarded-recharging and restricted-release position when there is an excessive brake pipe pressure operating on the release piston 2, as will be more fully hereinafter described.

An application valve H co-operates with the main and graduating valves to control communication between the service chamber C and the single-chamber brake cylinder B. When the main and graduating valves are moved to service position the application valve is moved to open communication between the service chamber and brake cylinder B for a service application of the brakes. When the desired brake cylinder pressure has been built up in the brake cylinder B the application valve is moved by brake cylinder pressure, plus the energy of an application valve spring, to lap position, thereby closing communication between the chamber C and the brake cylinder B. The application valve operates in such manner that pressure will be built up in the cylinder B in direct ratio to the brake pipe reduction, regardless of the length of brake cylinder piston travel in the cylinder B. If this piston travel is short, that is to say below the standard set in the apparatus, the excess pressure from chamber C will be passed back to the brake pipe through the operation of the application valve. If the piston travel is long, that is to say greater than the standard set for the apparatus, and the pressure in cylinder B is not as great as the ratio set for the apparatus, the application valve, co-operating with the graduating valve in service lap position, will admit brake pipe air to the cylinder B until the pressure is at the desired ratio to the reduction in brake pipe pressure.

A graduated-release valve I controls the release of brake cylinder pressure in direct proportion to the increase in brake pipe pressure. This graduated-release valve co-operates with the application valve and the main slide valve in graduated-release operations. This graduated-release valve is idle in its operations when the release-governing valve is in quick-release position. When the release-governing valve is in graduated-release position the release of brake cylinder pressure takes place entirely through the graduated-release valve, said valve co-operating, however, with the application valve and the main slide valve. The application valve is so constructed that brake cylinder pressure in cylinder B will be built up in direct ratio to the brake pipe reduction. Usually this ratio is two-and-one-half to one,—that is to say, for a ten-pound brake pipe reduction a twenty-five-pound pressure will be built up in the brake cylinder. The graduated-release valve is constructed in such manner as to maintain the same ratio of pressures in release operations; that is to say, a ten-pound increase in brake pipe pressure will result in a twenty-five-pound reduction of brake cylinder pressure. The graduated-release valve is subject to the pressure of the emergency chamber D of the double-chamber brake cylinder and the brake cylinder pressure, these two pressures being opposed by a substantially constant pressure from a quick-release reservoir. When the pressure in the emergency chamber D is reduced, as hereinafter described, the quick-release reservoir pressure will move the graduated-release valve in one direction. When the pressure in the emergency chamber D is increased, for a release of the brakes, the graduated-release valve will be moved to release position. At the same time the main slide valve and the application valve will move to release position and air will flow into the brake cylinder chamber of the graduated-release valve.

A quick-release valve J is provided, which operates, when the release-governing valve is in quick-release position, to place a quick-release reservoir in communication with the brake pipe to quickly raise the brake pipe pressure and thus secure a quick release of the brakes throughout the train.

An emergency valve mechanism K controls the exhaust of pressure from the service chamber C for emergency applications of the brakes. This emergency mechanism will operate only upon a sudden emergency reduction of brake pipe pressure. An equalization valve L co-operates with the emergency mechanism operating when the brake emergency operation when there is an equalization of pressures in the brake cylinder B and the service chamber C. This equalizing valve also prevents the emergency mechanism operating when the brake pipe pressure is drawn down below the pressure at which chamber C equalizes into cylinder B, so that an emergency application cannot be secured without an emergency reduction in brake pipe pressure.

The quick-service valve M operates to temporarily connect the brake pipe to the brake cylinder upon a reduction of brake pipe pressure. This is for the purpose of securing the quick serial action of the control valves throughout the train.

The release-governing valve mechanism N controls the rate of release of brake cylinder pressure. This valve has a graduated-release position and a quick-release position as hereinbefore described.

*Charging.*

In charging the system brake pipe air flows through the brake pipe connection E' into a brake pipe chamber 12, and from said chamber through passage 13 into the main brake pipe chamber 5. The increasing pressure in chamber 5 forces the release piston 2 inwardly to release and charging position. The spring 11 serves as a yielding charging stop and will hold the main slide valve in normal charging position under a normal charging pressure. This spring, however, will yield and permit the main slide valve to have an additional inward movement to retarded-charging position upon an excessive charging pressure. From chamber 5 air flows through passage 14 past check valve 15, to passage 16, this later passage leading directly into the main valve chamber 1. In the normal release position of the main slide valve a charging port 17 therein is in register with a port 18, said port being connected to a passage 19 which leads to a small chamber 20 in which is arranged a check valve 21. Air flowing into chamber 20 lifts valve 21 and passes into a passage 22. Passage 22 leads to a port 23 in the main slide valve seat. In the main slide valve is a port and passage 24 which, in the release position of the main slide valve, connects port 23 to port 25. Port 25 is connected to a passage 26 which leads to the service chamber C so that brake pipe air will flow from the main brake pipe chamber 5 through the ports and passages into the service chamber C.

The charging passage 13 is connected by passage 27 to a brake pipe chamber 28 of the emergency valve. In this chamber is arranged an emergency valve piston 29 which is moved inwardly to the limit of its movement by the brake pipe pressure in chamber 28. The piston 29 carries a valve stem 30 which extends inwardly through an emergency valve chamber 31, the piston 29 separating the chamber 31 from the brake pipe chamber 28. An emergency valve 32 is connected to the valve stem 30 and moves with it, and the inner end of the valve stem is suitably guided in the valve chamber. Connected to the passage 22 is a passage 32ª which leads into the emergency valve chamber 31, so that brake pipe air will be charged into said chamber and the pressures will equalize on opposite sides of the emergency piston 29. Connected to the emergency valve chamber 31 is a volume reservoir 33, said reservoir being in open communication with the chamber 31 at all times through passage 34.

Air flowing into the chamber C through passage 26 will force the emergency brake piston 35 toward the right hand as viewed in the drawings, to the limit of its movement. This movement of the piston 35 will uncover a port 36 which leads from the chamber C into the emergency chamber D, and air will flow from C into D. Connected to said chamber D is the reservoir G which augments the capacity of the chamber D. Connected to port 36 is a passage 37 which leads into chamber 6, so that air will be charged into said chamber and pressures will balance on opposite sides of the service piston 3.

Connected to the main brake pipe chamber 5 and in open communication therewith is a quick-release plunger chamber 38 in which is mounted a quick-release plunger 39. Brake pipe pressure in chamber 5 operates against one face of said plunger. In said plunger face is formed a port 40, so that air will flow from chamber 5 through said port into chamber 41 on the opposite side of said plunger. Chamber 41 is connected by passage 42 to a port 43 in the main slide valve seat. In the main slide valve is formed a long cavity 44 which connects port 43 to a port 45 in the main slide valve seat, and said port is connected by a passage 46 to the quick-release reservoir F. Cavity 44 also connects port 43 to a port 47 which is connected directly to a quick-release chamber 48 for a purpose which will hereinafter appear. In the passage 46 is arranged a check valve 49 which seats toward the port 45 and prevents air passing from the reservoir F back to said port. Connected to the passage 46 beyond the check valve 49 is a passage 50 which leads to the release pressure chamber 51 of the graduated-release valve structure, so that quick-release reservoir air will be always present in said chamber 51. The passage 37 is connected by a passage 52 to the actuating chamber 53 of the graduated-release valve structure so that emergency chamber pressure will be always present in said actuating chamber. The pressures in chambers D, 6 and 53 are always equal.

The charging passage 13 is connected with a passage 54 which leads into chamber 55 above the equalizing valve piston 56. Passage 54 also leads into the equalizing valve chamber 57 so that brake pipe pressure will be always in said chamber and will also operate on the upper side of the equalizing valve piston and hold the equalizing valve in closed position, except as hereinafter described.

An excessive brake pipe pressure in chamber 5 will move the main slide valve inwardly to restricted-charging position. In this position of the valve, restricted port 17$^a$ will be brought into register with the port 18. This will result in a delayed charging of the chamber C and also of chambers D, 6 and 53. The cavity 44 will be moved out of register with a port 45, thereby stopping the flow of air to the quick-release reservoir F and to the chamber 51 of the graduated-release valve structure. The port and passage 24 in the main slide valve is provided with extensions at its ends to maintain communication between ports 23 and 25 in retarded-charging position of the main slide valve. When there has been an equalization of pressures on opposite sides of the release piston 2 the charging stop spring will return the main slide valve to normal charging position, in which the charging operation will take place as hereinbefore described. When the pressures in all of the chambers have been equalized with the normal running brake pipe pressure, the system is fully charged.

Service application.

A service application of the brakes is brought about by a service reduction of brake pipe pressure in the usual manner. A service reduction of brake pipe pressure in chamber 12 will result in a corresponding reduction of pressure in the brake pipe chamber 28 of the emergency valve and in the main brake pipe chamber 5. The reduction of pressure in chamber 28 will result in a movement of the emergency valve toward the left as viewed in the drawings, by reason of the undisturbed pressure in chamber 31. The emergency valve will move outwardly until the spring-pressed service stop 58 of the emergency piston contacts with the end of the valve casing. The service stop spring 60 will be slightly compressed and the emergency piston and the emergency valve will continue to move until the service stop collar 58$^a$, at the right-hand end of the emergency valve stem, engages the yoke 72 of an emergency lever 73. The lever 73 is held yieldingly against inward movement by spring 74 which holds emergency check valve 75 to its seat. The yoke 72 and the spring 60, therefore, stop the emergency valve in service position upon a service reduction of pressure in chamber 28. This stops the emergency valve in position to uncover port 59 in the emergency valve seat. Air will flow from chamber 31 through port 59, passage 61, past check valve 62, through passage 63 to port 64 in the main slide valve seat. The service reduction of brake pipe pressure in chamber 5 results in a movement of the main slide valve toward the left as viewed in the drawings, until the service stop 65 formed on the outer side of the release piston 2 contacts with the abutment 66 formed in the valve casing. The spring-pressed plunger 67 will engage the outer wall of the valve casing and the service lap spring will be compressed. The undisturbed pressure in chamber 6 will force the service piston 3 toward the left until the stop 65 engages the stop shoulder 66. The lost motion between the valve stem and the main slide valve will be first taken up and then the main slide valve and the graduating valve will be moved into service position (Fig. 2). The movement of the main slide valve into service position causes the cavity 68 in the main slide valve to place port 64 in communication with port 69. Port 69 is connected to passage 70 which leads to a control chamber 71 of the application valve H. Through the ports and passages just described the emergency valve chamber 31 and the volume reservoir 33 are connected to the control chamber 71. Air will continue to flow into the control chamber until the pressure in chamber 31 has been reduced to a substantial equality with the brake pipe pressure in chamber 28, whereupon the spring 60 will move the emergency valve back to lap position and close port 59. This will prevent the flow of air from chamber 31 to the control chamber. The volumes of chambers 33 and 31 are so proportioned with respect to the volume of chamber 71 that there will be built up in chamber 71 the pressure which it is desired to secure in the brake cylinder for a given brake pipe reduction. This is usually at the ratio of two-and-one-half to one, so that a ten-pound pressure reduction in chamber 28 will result in building up a twenty-five-pound pressure in the control chamber 71 before the emergency valve is moved back to close the port 59. The pressure established in chamber 71 predetermines the amount of brake cylinder pressure built up in the brake cylinder.

When the main slide valve and the graduating valve are in service position a port 76 of the main slide valve registers with port 25. A cavity 77 in the graduating valve registers with port 76 and connects said port with a port 78 in the main slide valve. This latter port is in register with a port 79 which is connected to a passage 80 which leads to a small valve chamber 81 in which is arranged a ball check valve 82 which is the main application valve. Chamber 81 is connected directly to a brake cylinder pressure chamber 83 of the application valve structure. The main application valve 82 is normally seated and closes communication between the chamber 81 and the chamber 83, and this valve is opened by the pressure in chamber 71, as will be hereinafter described.

The application valve structure comprises two parallel diaphragms $a$ and $b$ spaced a suitable distance apart and secured around their marginal edges in the valve casing. These diaphragms are shown in the drawings as horizontally arranged. Between the diaphragm $a$ and the lower wall of the casing is formed the control chamber 71. Between the diaphragm $b$ and the upper wall of the valve casing is formed the brake cylinder pressure chamber 83. Between the two diaphragms is formed a release chamber 84. The central portions of the diaphragms are supported by rigid central clamping members and the supporting members of the two diaphragms abut together so that the two diaphragms move up and down together in response to variations of pressures in the chambers 71 and 83. The upper diaphragm $b$ carries a central upwardly extending stem 85 which is adapted to engage a central abutment 86 to limit the upward movement of the diaphragms. The lower diaphragm $a$ carries a central depending stop 87 which is adapted to engage the lower wall of the chamber 71 to limit the downward movement of the diaphragms. A valve-operating lever 88 is mounted in the chamber 83, said lever being pivoted at one end on a post 89 and being pivoted midway its ends at 90 to the central stop stem 85. The free end of this lever is adapted to engage the lower end of a pin 91 which extends from chamber 83 upwardly and into engagement with the check valve 82. When pressure is built up in the control chamber the diaphragms are moved upwardly and the lever 88 is swung on its pivot to open the valve 82, thereby permitting air to flow from chamber 81 into the chamber 83 until the pressure in said chamber is substantially equal to the pressure previously built up in chamber 71. The pressure in chamber 83 will then equal the desired brake cylinder pressure.

The brake cylinder pressure chamber 83 is connected by a passage 92 to the single-chamber brake cylinder B. Air will, therefore, flow from chamber 83 into the brake cylinder B. When the main and graduating valves are in service position and the main application valve is open, air will flow from the service chamber C into the chamber 83 and then into brake cylinder B until the pressure in said brake cylinder and in chamber 83 is substantially equalized with the pressure in chamber 71, whereupon the diaphragm structure will move downwardly and the valve 82 will seat and stop further flow of air from chamber C. Air will continue to flow into the brake cylinder until the required pressure is built up therein, regardless of the length of piston travel. The application valve 82 will close when the desired brake cylinder pressure has been built up in chamber 83 and, of course, this will occur regardless of the length of piston travel in the single-chamber brake cylinder chamber B.

As the pressure in chamber C is reduced, the emergency brake piston 35 will move toward the left as viewed in the drawings, and disconnect port 36 from chamber C. The piston 35 will be moved by the pressure in the emergency chamber D and said piston will continue to move toward the left until there is a substantial equilibrium between the opposed pressures on the piston 35. The movement of the piston 35 will reduce the pressure in chamber D and consequently in chamber 6, and also in the actuating chamber 53 of the graduated-release valve. The pressure in chamber 6 will be reduced to a substantial equality with the brake pipe pressure in chamber 5, with the result that the service lap spring 10 will move the graduating valve to lap position, thus cutting off communication between chamber C and the brake cylinder B.

In the release chamber 84 is pivoted a horizontally arranged lever 93, said lever being pivoted at 94 between its ends to the central stem of the diaphragm structure. The free end of this lever extends through a slot 95 in the valve casing and is connected to a main release valve 96. This release valve operates in a chamber 97. The chamber 83 is connected by a passage 98 to a port 99 in the release valve seat. The release valve is formed with a cavity 100 which, in the release position of the valve 96, connects port 99 with the slot 95 and to the chamber 84 so that in the release position of valve 96 brake cylinder pressure may flow from the brake cylinder B and chamber 83 into the chamber 84. Passage 80 is connected by a passage 101 to a port 102 in the seat of the release valve. In the normal or lap position of the release valve 96 port 102 opens directly into the release valve chamber 97. When the release valve is moved upwardly through the upward movement of the diaphragms $a$ and $b$, port 102 is closed so that said port will be closed when the main application valve 82 is open; but said port 102 will be open to the chamber 97 whenever the application valve 82 is closed. A spring 103 bears on the valve 96 and returns it to its normal or lap position. When the release valve is moved upwardly the spring 103 is compressed so that said spring tends to return the release valve to lap position when the application valve 82 is open and the force of said spring assists the pressure in chamber 83 in moving the diaphragms and the release valve back to normal position. The chamber 97 is connected by a passage 104 to the brake pipe passage 13.

In the event that the brake piston in cylinder B moves less than the normal or standard piston travel, the desired brake cylinder pressure will be built up in the cylinder B and in the chamber 83 before the pressure in chamber 6 has been sufficiently reduced to permit the graduating valve to be moved back to lap position, with the result that it would be difficult to secure a release of the brakes because of the high pressure in chamber 6. With the main and graduating valves in service position air may continue to flow from chamber C through passage 101 and port 102 into chamber 97, when the release valve 96 has been moved to normal position by the pressure in chamber 83 and by the force of the spring 103. From chamber 97 air may flow back through passages 104 and 13 to the brake pipe so that the excessive pressure in chamber C will be passed back to the brake pipe until the graduating valve is moved to lap position, thus cutting off communication between ports 25 and 79.

A supplemental application valve chamber 105 is provided with a supplemental application valve 106. This valve is in the form of a ball check. Chamber 105 is connected directly to the chamber 83 and the valve 106 seats toward said latter chamber. A pin 107 engages the valve 106 and its lower end projects into the chamber 83 and is adapted to be engaged by the upper end of the central stop stem 85. When the lever 88 is moved upwardly by the pressure in chamber 71 valve 106 is lifted from its seat, so that the main application valve 82 and the supplemental application valve 106 are opened by the upward movement of the lever 88. Chamber 105 is connected by a passage 108 to a port 109 in the main slide valve seat. The main slide valve is formed with a port 110, which, in the service position of the main slide valve, registers with port 109. The graduating valve is formed with a port 111 which, in the lap position of the graduating valve, registers with port 110. Ports 110 and 111 serve to connect port 109 to the chamber 1. When the main slide valve is in service position and the graduating valve is in service lap position, port 109 will be connected directly to the main valve chamber 1.

In the event that the piston in the brake cylinder B has a longer travel than is normal or standard for the apparatus the pressure in chamber D, and consequently in chamber 6, will be sufficiently reduced to permit the graduating valve to be moved back to lap position before the brake cylinder pressure in B and in chamber 83 has equalized with the pressure in the control chamber 71. The result of this will be that the main and supplemental application valves 82 and 106 will be held open. The movement of the graduating valve to lap position will cut off chamber C from application valve 82 but will place the main valve chamber in communication with the supplemental application valve 106. Brake pipe air will therefore flow from chamber 1 past valve 106 into chamber 83 and into the brake cylinder B until the desired pressure has been built up therein. When the desired pressure is secured the diaphragm structure will move downwardly and valves 82 and 106 will seat. As pressure is drawn from chamber 1 air will flow from chamber 5 through passage 14, past check valve 15 and through passage 16 into the chamber 1, should the pressure in chamber 1 be reduced below the brake pipe pressure in chamber 5.

The control chamber 71 is connected by a passage 112 to a chamber 113 below the equalizing piston 56, so that a pressure equal to the desired brake cylinder pressure will be always present under the piston 56 and opposed to the brake pipe pressure in chamber 55 above the equalizing piston. When the pressures of chambers 31 and 33 have been equalized into chambers 71 and 113 and the brake pipe pressure has been reduced in chamber 28 to an equality with the said equalized pressures, the maximum service application pressure has been secured in cylinder B and the pressures in chambers 55 and 113 on opposite sides of the equalizing piston have been equalized. A reduction of brake pipe pressure below this point of equalization would move the emergency valve to emergency position. The operation of the equalizing valve prevents this undesired emergency action. A further reduction of brake pipe pressure below the point of equalization will result in a reduction of pressure in chamber 55. The pressure in chamber 113 will be then superior to the pressure in 55 and the piston 56 will be moved upwardly.

Connected to the stem of the piston 56 is an equalizing valve 114 which operates in the equalizing valve chamber 57. In its normal or lower position the equalizing valve closes a port 115, said port being connected by a passage 116 to passage 32ª which leads into the emergency valve chamber 31. In passage 116 is arranged a check valve 117, said valve seating toward the passage 32ª so that air pressure cannot flow through port 115 to said passage but may flow in the opposite direction past said check valve. When the equalizing piston has been moved upwardly the equalizing valve 114 uncovers port 115, thereby permitting a flow of air from chamber 31 and connecting volume chamber 33 through passages 32ª and 116 with chamber 57. From chamber 57 air may flow through passage 54 to passage 13 and thence to the brake pipe. It is clear, therefore, that when brake pipe pressure is reduced below the pressure in chamber 113 air will flow from chambers 31 and 33 back to the brake pipe, thus maintaining the pressures on opposite sides of the emergency piston 29 substantially equalized. This will prevent the emergency valve moving to emergency position. The pressures in control chamber 71 and chamber 113 cannot be drawn down with the brake pipe under the conditions just set forth, because the check valve 62 prevents air from said two chambers flowing into the emergency valve chamber. Under the conditions specified the emergency valve will be in service position and port 59 will be uncovered. The main slide valve will be in service position and the graduating valve will be in service lap position. The brake cylinder pressure will be maintained so that pressures in chambers 71 and 83 will be substantially equal.

When the main slide valve moves to service position it uncovers port 118 and said port is connected by passage 119 to a small chamber 120. Chamber 120 is connected to a small chamber 121 by passage 122. In the chamber 121 is arranged a quick-service valve 123, said valve seating toward the chamber 120 and preventing pressure passing from 121 into chamber 120. When port 118 is uncovered brake pipe air will flow from the main valve chamber 1 into chamber 120 and will unseat valve 123 and flow into chamber 121. From this latter chamber air may flow through passage 124 into passage 92 and thence into the brake cylinder pressure chamber 83. The inflowing brake pipe air may also flow through passage 92 directly into the brake cylinder B.

This permits a certain quantity of brake pipe air to flow directly to the brake cylinder immediately upon the opening of port 118. This flow of brake pipe air to the brake cylinder will continue for a short time and the valve 123 will be seated as soon as there is a certain amount of pressure built up in the brake cylinder.

The chamber 121 is formed in the lower part of the valve casing of the quick-service valve mechanism M. At the upper end of this valve casing is formed a chamber 125 and said chamber is connected by passage 126 to the chamber 121. In the chamber 125 is arranged a vertically movable piston 127 of large area compared with the area of the valve 123. Piston 127 is formed with a central depending tubular stem 128. On the lower end of this stem is formed a piston 129 which is smaller in area than the piston 127. Piston 129 reciprocates in chamber 121 and its under side is exposed to the pressure in said chamber. The lower side of the piston 129 is formed with a depending central extension which is adapted to contact with the upper side of the valve 123 at the center thereof and to serve as a means for holding said valve on its seat. Within the tubular extension 128 is arranged a coil spring 130, the lower end of said spring engaging the piston 129 and the upper end thereof engaging the upper wall of the valve casing. The pistons 127 and 129 are connected to the casing in which they reciprocate by the flexible bellows 131 which form air-tight connections and prevent leakage of air around said pistons. When the valve 123 is opened by brake pipe pressure in chamber 120, the pistons 129 and 127 are moved upwardly slightly. Air will flow from chamber 121 through the passage 126 into the chamber 125. The piston 127 is very much larger in area than the piston 129 so that a comparatively light pressure in 125 will force the pistons 127 and 129 downwardly to seat the valve 123. This will stop the flow of brake pipe air to the brake cylinder. The pistons 129 and 127 may be properly proportioned to permit the desired flow of air from the brake pipe to the brake cylinder at the beginning of each brake application. This venting of brake pipe air to the brake cylinder assists in the quick serial action of the control valves throughout the train.

Service lap position.

When the pressures in chambers D, 6 and 53 have been sufficiently reduced by expansion, due to the movement of the piston 35, the service lap spring 10 will move the piston 2 and the graduating valve 9 to lap position as shown in Fig. 6. Cavity 77 of the graduating valve will be moved out of register with port 76, thereby interrupting the flow of air from chamber B to the application valve chamber 81 and to port 102 of the release valve 96. The reduction of pressure in chamber 53 will permit the undisturbed pressure in release pressure chamber 51 to lift the diaphragm structure and the graduated-release valve, but this movement will be an idle one. The graduated-release valve has no function in the brake application operation of the control valve.

Release after service—quick release.

To effect a release of the brakes after a service application, the brake pipe pressure must be increased in the usual manner through manipulation of the engineer's brake valve. The increased brake pipe pressure will flow through passage 13 into chamber 28 and force the emergency piston and the emergency valve to their inner position. The brake pipe pressure will also flow through passage 13 into main brake pipe chamber 5 and force the release piston 2 and the main and graduating valves into normal release and charging position, as shown in Fig. 1. A collar 132 on the main valve stem will engage the inner end 133 of a tubular abutment 134 which surrounds the valve stem. Within the tubular abutment is arranged a charging stop spring 11. One end of this spring bears against the end wall 133 of the abutment, its other end bearing against a tubular rigid stop 135 which is carried by a rigid cross wall 136 and extends into the tubular abutment. The inner end of the stop 135 is formed with an upwardly extending flange which is adapted to be engaged by an inwardly turned flange carried by the end wall 137 of the tubular abutment. These two flanges are adapted to engage each other, the flange on the stop limiting the inward movement of the tubular abutment under the force of the spring 11. When the piston 2 is forced inwardly to release position by a normal rate of rise of brake pipe pressure, the spring 11 will stop the main and graduating valves in normal release and reservoir charging position but will yield under an abnormal brake pipe pressure in chamber 5 to permit the main slide valve to move to retarded-recharging and restricted-release position, as will be hereinafter described.

In the valve casing is formed a main brake cylinder exhaust chamber 138 and this chamber is connected through passage 139 to a large atmospheric port 140. A release-governing valve 141 is arranged in chamber 138 and closes communication between that chamber and the exhaust port 140. A spring 142 normally holds valve 141 on its seat. Below the valve 141 is arranged a vertically movable pin 143, the upper end of said pin being adapted to engage the lower end of the valve. Below the pin 143 is arranged a manually operable rod 144 which is formed with a recess 145 and the cam surface 146. This rod is adapted to be moved outwardly to quick-release position and to be moved inwardly to graduated-release position, the pin and slot 147 serving as means to limit the in and out movements of the rod 144. In the quick-release position of the rod 144 cam 146 engages the pin 143 and forces it upwardly against the valve 141 and lifts said valve from its seat. This places chamber 138 in direct communication with atmosphere through the passage 139.

In the release position of the main slide valve the control chamber 71 of the application valve is connected by passage 70 to port 69 of the main slide valve seat. A cavity 148 of the main slide valve connects port 69 to a port 149 in the main slide valve seat and said port is connected by passage 150 to chamber 138. Air from the control chamber 71 will therefore flow to the atmospheric port 140. As the pressure in chamber 71 is reduced the brake cylinder pressure in chamber 83 will move the diaphragms $a$ and $b$ downwardly and carry the main release valve 96 to release position and connect port 99 through cavity 100 with the release chamber 84, so that brake cylinder pressure will flow from the brake cylinder B and the chamber 83 into the release chamber 84. The diaphragms $a$ and $b$ are of the same area so that pressure flowing into chamber 84 will have no effect upon the diaphragm structure. From chamber 84 air will flow through the release passage 151 into passage 70 and thence, as previously described, to atmosphere through chamber 138 and atmospheric port 140. In the passage 151 is arranged a check valve 152 which seats toward the chamber 84 and prevents the flow of air from passage 70 to said chamber.

When the main slide valve is in release position cavity 44 thereof connects port 43 to port 47. Air then may flow from chamber 41 through passage 42, port 43, cavity 44, port 47 to the quick-release chamber 48. This will reduce the pressure in chamber 41 and permit brake pipe pressure in chamber 5 to force the quick-release plunger 39 inwardly. The plunger 39 is connected to one arm of a quick-release lever 153 which is mounted in the brake pipe chamber 5. The other arm of this lever is adapted to engage a quick-release valve 154 and lift it from its seat, said valve being normally held seated by a spring. The valve 154 is arranged in a chamber 155 and said chamber is connected by a passage 156 to a chamber 157. In this latter chamber is arranged a check valve 158 which seats downwardly and normally closes a passage between chamber 157 and a chamber 159. Chamber 159 is connected by passage 160 to the passage 46 which leads to the quick-release reservoir F. When the quick-release valve 154 is raised, air may flow from the reservoir F past check valve 158 through passage 156, past check valve 154 into chamber 5 and thence into the brake pipe through passage 13. Air may also pass from chamber 5 through passage 14, past check valve 15 and then through passage 16 into the main slide valve chamber. From chamber 1 air will pass through the charging ports as hereinbefore described.

When the pressure in chamber 48 has equalized with the pressure in chamber 41 and in chamber 5, the quick-release plunger will be moved back to its normal position by the spring 161 and the quick-release valve 154 will close. The pressures in chambers 5, 41 and 48 will equalize through the leak port 40 formed in the quick-release plunger. The size of the chamber 48 will determine the length of time that the quick-release valve 154 remains open and consequently will determine the amount of quick-release reservoir air that will flow to the brake pipe and to the main valve chamber 1.

When the main slide valve is moved to service position a cavity 162 therein will connect port 47 to port 163. This latter port is connected by passage 164 to a small chamber 165. In said chamber is arranged a check valve 166 which is normally seated by spring 167. This valve controls a passage 168 which leads to an atmospheric port 169. The release-governing rod 144 is formed with a cam 170 which is adapted to engage a pin 171 and force it upwardly when the release-governing rod is moved outwardly to quick-release position. The pin 171 engages the lower end of the valve 166 and forces it upwardly from its seat, thereby opening chamber 165 to atmosphere. When port 47 is connected to port 163, as just described, the air in the quick-release chamber 48 will flow to atmosphere through atmospheric port 169.

An excessive brake pipe pressure in chamber 5 will move the main slide valve inwardly to restricted-release position. In this position the valve cavity 148 of the main slide valve will be out of register with the release port 149. The release passage 150 will be connected to the passage 148 through a restricted release port 149$^a$. Cavity 148 will be in register with port 69 of the main slide valve seat, so that brake cylinder pressure from the release chamber 84, and control chamber pressure, may flow through passage 70, port 69, cavity 148 of the main slide valve, restricted release port 149$^a$ and passage 150 to atmosphere, as hereinbefore described. When there has been an equalization of pressures on opposite sides of the release piston 2, the charging stop spring will return the main slide valve to normal release position, in which position the normal release operation will take place as hereinbefore described.

*Release after service—graduated release.*

The control valve is adjusted for graduated-release operations by moving inwardly the release-governing rod 144 to the position shown in Fig. 5. The inward movement of this rod will permit the valves 141 and 166 to be seated by their springs, thus closing communication between the chambers 138 and 165 and atmosphere.

To effect a graduated-release of the brakes the brake pipe pressure must be increased in the usual manner a predetermined amount, and the increased brake pipe pressure must be less than the full running pressure or full charging pressure.

The increased brake pipe pressure will move the parts to release position precisely as described under the heading "Release after service—Quick release." The chamber 41 will be connected to the quick-release chamber 48 in the release position of the main slide valve precisely as hereinbefore described, but the quick-release plunger will not be operated to open the quick-release valve, because chamber 48 will be charged with air at brake pipe pressure. When the main slide valve is moved to service position the air in chamber 48 cannot escape to atmosphere because valve 166 is closed. The control chamber 71 will be connected to passage 150 through cavity 148 in the main slide valve. Valve 141 is closed so that air cannot pass from chamber 138 to atmosphere. Chamber 138 is connected by passage 172 to the brake cylinder pressure chamber 173 of the graduated-release valve structure, so that air will flow from the control chamber 71 into the brake cylinder pressure chamber 173.

The graduated-release valve structure comprises an actuating diaphragm $c$; an equalizing diaphragm $d$; and a release diaphragm $e$. These diaphragms are suitably mounted in a casing and are parallel with each other to form a series of chambers. The diaphragm $d$ is larger in area than the actuating diaphragm $c$ for a purpose which will hereinafter appear. Between the diaphragm $c$ and the upper wall of the valve casing is formed the actuating chamber 53. The brake cylinder pressure equalizing chamber 173 is formed between the actuating diaphragm $c$ and the equalizing diaphragm $d$. Between the diaphragms $d$ and $e$ is formed a retention chamber 174, the function of which will hereinafter fully appear. Between the release diaphragm $e$ and the lower wall of the valve casing is formed the release chamber 51. The central supports of the diaphragms are in close engagement with each other so that the diaphragms move up and down together, or substantially so, in accordance with the variations in the controlling pressure in the chambers of the diaphragm structure. The release diaphragm $e$ carries a downwardly extending release stop $e'$ and the actuating diaphragm $c$ carries an upwardly extending central stop $c'$, said stop being formed on the upper end of a central stem. These stops limit the up-and-down movements of the diaphragms. In the actuating chamber 53 is arranged a lever 175. One end of this lever is pivoted on a rigid post secured to the wall of the actuating chamber, and the other end thereof is connected to a valve rod 176. Intermediate its ends the lever 175 is connected to the upwardly extending stop stem $c'$ so that the lever will be swung up and down by the up-and-down movements of the actuating diaphragm. On the lower end of the valve rod 176 is mounted a graduated-release valve 177 and said valve is held in its normal, inactive or non-release position by a spring 178.

As hereinbefore pointed out the reduction of pressure in chamber 53, due to the expansion of the air in chamber D, will permit the undisturbed pressure in chamber 51 to raise the diaphragm structure and the valve 177, thereby placing the spring 178 under tension. This will be an idle movement of the graduated-release valve 177. As pressure flows from chamber 71 into the equalizing chamber 173 the downward force exerted by said pressure will tend to move the diaphragm structure and the graduated-release valve downwardly. Pressure will continue to build up in chamber 173 until the downward force exerted on the diaphragm $d$, plus the pressure in chamber 53 operating on the diaphragm $c$, is sufficient to overcome the pressure in chamber 51, and move the valve to release position, as shown in Fig. 5$^a$. In this position of the valve 177 chamber 173 will be connected by passage 179, and cavity 180 of the valve 177, to an exhaust port 181 in the seat of valve 177. Port 181 is connected by passage 182 to port 183 in the seat of the emergency valve 31. In the emergency valve is formed a long cavity 184 which, in all positions of said valve except the emergency position, connects port 183 to an atmospheric port 185. In the release position of the graduated-release valve 177 air will therefore flow from the control chamber 71 through the ports and passages just described to the equalizing chamber 173.

When the pressure in chamber 71 has been reduced the brake cylinder pressure in chamber 83 will move the diaphragms $a$ and $b$ and the release valve 96 to release position and cavity 100 will connect the chamber 83 through passage 98 to the release chamber 84. From the said chamber 84 air will pass through passage 151 into passage 70 and then through the ports and passages hereinbefore described into the chamber 173, and thence to atmosphere through atmospheric port 185 in the emergency valve seat.

The retention chamber 174 is connected by a passage to a port 186 in the seat of the graduated release valve 177. Exhaust port 181 is connected by a restricted passage 186$^a$ to the retention chamber 174. When the valve 177 is in release position passage 179 and port 186 are connected to the exhaust port 181 by the cavity 180 of said valve. Air may then flow from chamber 173 through port 186 into the retention chamber and also through port 181 into passage 182 and thence to atmosphere through the port 185, as hereinbefore described. Pressure will build up in chamber 174 while the valve 177 is in release position and this pressure will exert an upward pressure on the equalizing diaphragm $d$ and tend to balance the downward force exerted on the said diaphragm by the pressure in the chamber 173, and to that extent assist the pressure in chamber 51 in moving the valve 177 back to non-release position.

The increased pressure in the main valve chamber 1 will flow through the charging ports 17 and 18 and thence through the connected passages as hereinbefore described, through the charging port and passage 24 of the main slide valve and thence through port 25 and passage 26 into the chamber C, so that the pressure in chamber C will equalize with the increased brake pipe pressure. The increasing pressure in chamber C will force the piston 35 toward the chamber D and increase the pressure therein, and this will result in an increase of pressure in chamber 6 and in chamber 53. The increased pressure in chamber 6 will be substantially equal to the increased brake pipe pressure in chamber 5. The increased pressure in chamber 53 will not be sufficient to move the graduated-release valve to release position, because of the undisturbed full pressure in chamber 51. The flow of pressure from the control chamber 71 and from the brake cylinder pressure chamber 83 into chamber 173 will cause the diaphragm structure and the graduated-release valve to move downwardly to release position and air from the brake cylinder will flow to atmosphere, as described. Air will continue to flow from the brake cylinder and from the control chamber to atmosphere until the pressure in chamber 174 has been built up through the port 186 to a sufficient degree to assist the undisturbed pressure in chamber 51 to move the diaphragm structure and the graduated-release valve upwardly to non-release position. The amount of pressure necessary in chamber 174 will be dependent upon the amount of increase of pressure in chamber 53. When the valve 177 is moved upwardly to non-release position air will flow from chamber 174 through the restricted passage 186ª into the passage 182 and thence to atmosphere through port 185. The pressure in chamber 174 will be reduced to such an extent that the pressures in chambers 53 and 173 will again force the valve 177 to release position. Pressure will again flow to atmosphere from chamber 173 and will be again built up in chamber 174 and the valve 177 will be again moved back to non-release position. This operation will continue until the pressure in chamber 173 has been so reduced that the combined pressures in chamber 53 and 173 are not sufficient to move the valve to release position. The valve will then remain in non-release position with the passage 179 closed thereby trapping the pressure in chamber 173.

The increase of pressure in chamber 53 depends upon the increase of pressure in chamber C. It is, therefore, clear that when effecting a partial release of the brakes the extent of the increase of brake pipe pressure will determine the amount of pressure exhausted from the control chamber 71 and the brake cylinder B and the brake cylinder pressure chamber 83.

The equalizing diaphragm $d$ is so proportioned with respect to the actuating diaphragm $c$ and the release diaphragm $e$ that the release of brake cylinder pressure will be at a ratio of two-and-one-half to one,— that is to say for a five-pound increase of pressure in chamber 53 there will be a twelve-and-one-half-pound reduction in brake cylinder pressure. This ratio is the same as the ratio of brake cylinder pressure built up for a given brake pipe reduction as hereinbefore described.

If it is dsired to make a further partial reduction in brake cylinder pressure the brake pipe pressure is again increased a predetermined amount. This will result in an increase of pressure in chamber 53 and the diaphragm structure and the graduated-release valve will be again moved to release position. Air will flow from chamber 173 to atmosphere as previously described, and the pressure in chambers 71 and 83 and in the brake cylinder B will be reduced. Air will also flow through the restricted port 186 into chamber 174 until, the undisturbed pressure in chamber 51 will overcome the increased pressure in chamber 53 and the valve 177 will be again moved back to non-release position, and the operation hereinbefore described will be repeated.

The pressures remaining in chambers 71 and 83, upon partial release of brake cylinder pressure, will be equal to the pressure trapped in chamber 173 and the release valve will be moved to lap position. If it now be desired to increase the brake cylinder pressure the brake pipe pressure is again reduced. This will result in connecting the emergency valve chamber 31 and the volume chamber 33 to the control chamber and air will flow into the control chamber until the pressure in chamber 31 has been sufficiently reduced to permit the brake pipe pressure in chamber 28 to force the emergency valve back to lap position thereby interrupting the flow of air to the control chamber. It is to be noted, that this flow of air to the control chamber will be on top of the pressure trapped in the control chamber by the movement of the valve 177 to non-release position. This will result in building up a higher pressure in the control chamber than would ordinarily result from the given brake pipe reduction. The brake cylinder pressure will then be built up to equalize with the increased pressure in the control chamber and the brake cylinder pressure will be at a greater ratio than two-and-one-half to one.

The purpose of permitting air to flow into chamber 174 is to provide means for maintaining the brake cylinder pressure, and the control chamber pressure, higher than the predetermined two-and-one-half to one ratio during cycling operations. As is well known, "cycling" consists of rapidly alternating applications and releases and is usually resorted to when the train is traveling down grade. If the cycling operations are slow with a considerable period between the application and release operations, the pressure in chamber 174 will blow down; and if the periods are long the pressure in chamber 174 will be reduced to atmospheric pressure. When, however, the cycling operations are rapid, as when the train is traveling down a heavy grade, a certain amount of pressure will be retained in chamber 174. This retained pressure opposes the pressure retained in chamber 173. If, while pressure is retained in chamber 174, another release is made the pressure retained in chamber 173 on this second release will be higher than the amount retained therein on the first release. This will result in retaining the same high pressure in the control chamber 71 and in the brake cylinder pressure chamber 83. On the next application the pressure built up in the control chamber 71 will be again increased resulting in a still further increase in the brake cylinder pressure. As hereinbefore stated, however, if the cycling operations are slow the pressure in chamber 174 will blow down to atmosphere and then the graduated release valve will retain brake cylinder pressure at the ratio of two-and-one-half to one in graduated release operations.

The brake cylinder pressure may be reduced in steps by increasing the brake pipe pressure in steps. When it is desired to secure a full slow release of the brakes the brake pipe pressure is increased to normal running pressure. This will result in an increase of pressure in chamber 53 equal to the pressure in chamber 51, and the graduated-release valve will remain in release position until the brake cylinder pressure has been entirely exhausted through chamber 173. The pressures will tend to equalize on opposite sides of the diaphragm $d$ when securing a full slow release of the brake cylinder pressure, but because of the high pressure in chamber 53 equal to the pressure in chamber 51, the valve 177 will remain in release position, the spring 178 having no effect upon the valve when it is moved down to release position. The pressure in both chambers 173 and 174 will therefore flow to atmosphere until there has been a complete release of brake cylinder and control chamber pressures.

Emergency application.

An emergency application of the brakes is effected by an emergency reduction of brake pipe pressure in the usual manner. An emergency reduction of brake pipe pressure in chamber 12 will result in a corresponding reduction of pressure in chamber 5 and chamber 28. The reduction in chamber 5 will result in the main slide valve and the graduating valve moving to service position. The reduction of pressure in chamber 28 will result in the emergency valve 32 moving to emergency position, as shown in Fig. 4. The emergency valve in moving to emergency position first uncovers port 59 and this results in an equalization of pressures from chambers 33 and 31 into the control chamber 71. The pressure in chamber 71 moves the diaphragm structure upwardly and opens the application valve 82 and holds it open until there has been an equalization of pressures from chamber C into the brake cylinder B, whereupon there will be an equalization of pressures in chambers 83 and 71 and the application valve will be closed as hereinbefore described.

The movement of the emergency piston 29 to emergency position will cause the collar 58ª to swing the emergency lever 73 on its pivot and lift the emergency check valve 75 from its seat. This will permit air to flow from chamber C through passages 26 and 187, to chamber 188 above the check valve 75. When said check valve is unseated air may flow from chamber 188 directly into the emergency valve chamber 31. The movement of the emergency valve to emergency position uncovers an emergency port 189, which port is connected by a passage 190 to chamber 191 of the emergency pilot valve 192. Connected to this valve is a pilot valve piston 193, said piston being subject on one side to the pressure in chamber 191 and on its opposite side to the pressure in chamber 194. A spring 195 normally holds the pilot valve 192 and its connected piston in their inner positions so that the pilot valve will uncover an atmospheric port 196. This port, in the normal position of the pilot valve, connects chamber 191 to atmosphere. The pressure flowing into chamber 191 moves the piston 193 outwardly against the tension of spring 195 and causes the pilot valve to close the atmospheric port 196. Air will flow from chamber 191 through passage 197 into chamber 198. In said chamber is arranged a piston 199 which is connected to one arm of a bell-crank lever 200. The other arm of said lever is adapted to engage the emergency brake pipe vent valve 201 and lift it from its seat. Valve 201 is arranged in brake pipe chamber 12 and when said valve is raised from its seat said chamber is open direct to atmosphere through the large exhaust port 202. The valve 201 normally closes said exhaust port. The piston 199 will be moved by the air flowing into chamber 198 from chamber 191. A port 203 will be uncovered by the pilot valve 192 and said port is connected by passage 204 to chamber 194 to permit an equalization of pressure on opposite sides of the piston 193. When these pressures have equalized spring 195 will move the pilot valve to close port 203 and open port 196. Air will then flow from chambers 198 and 191 to atmosphere and spring 205 will move the piston 199 and the bell-crank lever 200 back to normal position, and the emergency vent valve 201 will be closed by its spring. Passage 204 is connected by passage 206 and passage 124, this latter passage being connected to the brake cylinder pressure chamber 83 through passage 92 so that should the pressure in chamber 191 be higher than the brake cylinder pressure in chamber 83, there will be an equalization of said pressures through the passages just noted. In passage 204 is arranged a check valve 208 which seats toward the port 203 to prevent air flowing from the chamber 83 back to chamber 191.

Chamber 55 of the equalizing valve, and the equalizing valve chamber 57, are connected by passage 54 to the brake pipe passage 13 and, through said passage, are open to the brake pipe chamber 12. When the brake pipe vent valve 201 is open the pressure in chambers 55 and 57 will be reduced and the equalizing piston will be forced upwardly by the pressure in chamber 113. The upward movement of the equalizing valve 114 will uncover port 115 and permit air to flow from the emergency valve chamber 31 through passage 32ᵃ and 116, past check valve 117 through port 115 into chamber 57 and thence through passage 54 to the brake pipe passage 13, and thence to atmosphere through brake pipe chamber 12. At this time chamber C is connected to the emergency valve chamber 31 through passages 26, 187, past check valve 75 and thence to chamber 31. By this means the pressure remaining in chamber C, after equalization into brake cylinder B, will be exhausted to atmosphere.

When the pressure from chamber C has been vented to atmosphere the pressure in chamber D and in the connected reservoir will expand and force the piston 35 into the chamber C and exert its force on the braking devices, and this force will be added to the force exerted through the piston of cylinder B.

After the pressure from chamber C has equalized into the chamber 83 and the brake cylinder B the application valve 82 will close. Should there be any leakage of air from chamber 83 past valve 82, after the chamber C has been exhausted to atmosphere, the check valve 209 in passage 80 will prevent said air flowing back to chamber C. Any leakage from chamber 83 or from the brake cylinder B will result in an upward movement of the release valve into position to cover the port 102 so that communication between passages 80 and 101 and the brake pipe passage 13 will be closed.

What I claim is:

1. An air brake apparatus comprising a single chamber brake cylinder, a double chamber brake cylinder, a movable piston in the double chamber cylinder dividing said cylinder into a service chamber and an emergency chamber, main and graduating slide valves, operating pistons connected thereto, an application valve provided with a control chamber and a brake cylinder pressure chamber, an emergency valve, a volume chamber connected to the emergency valve chamber, means whereby the emergency valve in service position and the main and graduating valves in service position will connect the emergency valve chamber and the volume chamber to the control chamber of the application valve to build up a pressure in the control chamber in direct ratio to the brake pipe reduction, means whereby the pressure in the control chamber will open the application valve to permit air to flow from the service chamber of the double chamber cylinder through the application valve into the brake cylinder pressure chamber of the application valve and from said chamber to the single chamber brake cylinder, and means whereby when the pressure in the brake cylinder chamber of the application valve equals the pressure in the control chamber the application valve will close.

2. An air brake apparatus of the Kunze Knorr type, comprising an application valve provided with a control chamber and a brake cylinder pressure chamber, means operating upon a reduction of brake pipe pressure to connect an air supply to the control chamber of the application valve to build up a pressure in the control chamber in direct ratio to the brake pipe reduction, means whereby the pressure in the control chamber will open the said application valve to permit air to flow from the service chamber of the double chamber cylinder into the brake cylinder pressure chamber of the application valve and into the single chamber brake cylinder, and means whereby when the pressure in the brake cylinder pressure chamber of the application valve substantially equals the pressure in the control chamber the application valve will close.

3. An air brake apparatus of the Kunze Knorr type, comprising an application valve provided with a control chamber and a brake cylinder pressure chamber, means operating upon a reduction of brake pipe pressure to connect an air supply to the control chamber of the application valve to build up a pressure in the control chamber equal to the desired brake cylinder pressure, means whereby the pressure in the control chamber will open the said application valve to permit air to flow from the service chamber of the double chamber cylinder into the brake cylinder pressure chamber of the application valve and into the single chamber brake cylinder, and means whereby when the pressure in the brake cylinder pressure chamber of the application valve substantially equals the pressure in the control chamber the application valve will close.

4. An air brake apparatus comprising a single chamber brake cylinder, a double chamber brake cylinder, a movable piston in the double chamber cylinder dividing said cylinder into a service chamber and an emergency chamber, main and graduating slide valves, operating pistons connected thereto, an application valve provided with a control chamber and a brake cylinder pressure chamber, an emergency valve, a volume chamber connected to the emergency valve chamber, means whereby the emergency valve in service position will connect the emergency valve chamber and the volume chamber to the control chamber of the application valve to build up a pressure in the control chamber in direct ratio to the brake pipe reduction, means whereby the pressure in the control chamber will open the application valve to permit air to flow from the service chamber of the double chamber cylinder through the application valve into the brake cylinder pressure chamber of the application valve and from said chamber to the single chamber brake cylinder, means whereby when the pressure in the brake cylinder chamber of the application valve equals the pressure in the control chamber the application valve will close, and an equalizing valve subject to brake pipe and control chamber pressures and operating upon a reduction of brake pipe pressure below the control chamber pressure to connect the volume chamber and the emergency valve chamber to the brake pipe.

5. An air brake apparatus comprising a single chamber brake cylinder, a double chamber brake cylinder, a movable piston in the double chamber cylinder dividing said cylinder into a service chamber and an emergency chamber, main and graduating slide valves, operating pistons connected thereto, an application valve provided with a control chamber and a brake cylinder pressure chamber, an emergency valve, a volume chamber connected to the emergency valve chamber, means whereby the emergency valve in service position will connect the emergency valve chamber and the volume chamber to the control chamber of the application valve to build up a pressure in the control chamber in direct ratio to the brake pipe reduction, means whereby the pressure in the control chamber will open the application valve to permit air to flow from the service chamber of the double chamber cylinder through the application valve into the brake cylinder pressure chamber of the application valve and from said chamber to the single chamber brake cylinder, means whereby when the pressure in the brake cylinder chamber of the application valve equals the pressure in the control chamber the application valve will close, an equalizing valve subject to brake pipe and control chamber pressures and operating upon a reduction of brake pipe pressure below the control chamber pressure to connect the volume chamber and the emergency valve chamber to the brake pipe, and means whereby an emergency reduction of brake pipe pressure will connect the said service chamber to atmosphere.

6. An air brake apparatus of the Kunze Knorr type, comprising a single chamber brake cylinder, a double chamber brake cylinder, a movable piston in the double chamber cylinder dividing said cylinder into a service chamber and an emergency chamber, and means operating upon a reduction of brake pipe pressure to connect the said service chamber to the single chamber brake cylinder to build up in said brake cylinder a pressure at a predetermined ratio to the brake pipe reduction without regard to the length of brake cylinder piston travel.

7. An air brake apparatus of the Kunze Knorr type, comprising a single chamber brake cylinder, a double chamber brake cylinder, a movable piston in the double chamber cylinder dividing said cylinder into a service chamber and an emergency chamber, means operating upon a reduction of brake pipe pressure to connect the said service chamber to the single chamber brake cylinder to build up in said brake cylinder a pressure at a predetermined ratio to the brake pipe reduction without regard to the length of brake cylinder piston travel, and means adapted to operate when the service chamber of the double chamber brake cylinder has been equalized into the single chamber brake cylinder to prevent the air remaining in the said service chamber flowing to atmosphere when the brake pipe pressure is reduced below said point of equalization.

8. An air brake apparatus of the Kunze Knorr type, comprising an application valve provided with a control chamber and a brake cylinder pressure chamber, means operating upon a reduction of brake pipe pressure to connect an air supply to the control chamber of the application valve to build up a pressure in the control chamber equal to the desired brake cylinder pressure, means whereby the pressure in the control chamber will open the said application valve to permit air to flow from the service chamber of the double chamber cylinder into the brake cylinder pressure chamber of the application valve and into the single chamber brake cylinder, means whereby when the pressure in the brake cylinder pressure chamber of the application valve substantially equals the pressure in the control chamber the application valve will close, and means adapted to operate when the service chamber of the double chamber brake cylinder has been equalized into the single chamber brake cylinder to prevent the air remaining in the said service chamber flowing to atmosphere when the brake pipe pressure is reduced below said point of equalization.

9. An air brake apparatus of the Kunze Knorr type, comprising a single chamber brake cylinder, a double chamber brake cylinder, a movable piston in the double chamber cylinder dividing said cylinder into a service chamber and an emergency chamber, means operating upon a reduction of brake pipe pressure to connect the said service chamber to the single chamber brake cylinder, and means adapted to operate when the service chamber of the double chamber brake cylinder has been equalized into the single chamber brake cylinder to prevent the air remaining in the said service chamber flowing to atmosphere when the brake pipe pressure is reduced below said point of equalization.

10. An air brake apparatus of the Kunze Knorr type, comprising a single chamber brake cylinder, a double chamber brake cylinder, a movable piston in the double chamber cylinder dividing said cylinder into a service chamber and an emergency chamber, means operating upon a reduction of brake pipe pressure to connect the said service chamber to the single chamber brake cylinder to build up in said brake cylinder a pressure at a predetermined ratio to the brake pipe reduction without regard to the length of brake cylinder piston travel, and means operating upon a reduction of brake cylinder pressure to connect the brake pipe to the brake cylinder to compensate for the reduction in brake cylinder pressure.

11. An air brake apparatus of the Kunze Knorr type, comprising a single chamber brake cylinder, a double chamber brake cylinder, a movable piston in the double chamber cylinder dividing said cylinder into a service chamber and an emergency chamber, means operating upon a reduction of brake pipe pressure to connect the said service chamber to the single chamber brake cylinder to build up in said brake cylinder a pressure at a predetermined ratio to the brake pipe reduction without regard to the length of brake cylinder piston travel, and means operating upon a reduction of brake cylinder pressure to connect an air supply to the brake cylinder to compensate for the reduction in brake cylinder pressure.

12. An air brake apparatus of the Kunze Knorr type, comprising a single chamber brake cylinder, a double chamber brake cylinder, a movable piston in the double chamber cylinder dividing said cylinder into a service chamber and an emergency chamber, means operating upon a reduction of brake pipe pressure to connect the said service chamber to the single chamber brake cylinder to build up in said brake cylinder a pressure at a predetermined ratio to the brake pipe reduction without regard to the length of brake cylinder piston travel, and means operating after a service application of the brakes to connect the service chamber to the brake pipe to permit excess pressure from said chamber to flow to the brake pipe.

13. An air brake apparatus of the Kunze Knorr type, comprising a single chamber brake cylinder, a double chamber brake cylinder, a movable piston in the double chamber cylinder dividing said cylinder into a service chamber and an emergency chamber, means operating upon a reduction of brake pipe pressure to connect the said service chamber to the single chamber brake cylinder to build up in said brake cylinder a pressure at a predetermined ratio to the brake pipe reduction without regard to the length of brake cylinder piston travel, and means adapted to operate when the brake cylinder is below the desired pressure to connect the brake pipe to the brake cylinder to build up the desired pressure therein.

14. An air brake apparatus of the Kunze Knorr type, comprising a single chamber brake cylinder, a double chamber brake cylinder, a movable piston in the double chamber cylinder dividing said cylinder into a service chamber and an emergency chamber, means operating upon a reduction of brake pipe pressure to connect the said service chamber to the single chamber brake cylinder to build up in said brake cylinder a pressure at a predetermined ratio to the brake pipe reduction without regard to the length of brake cylinder piston travel, and means subject to brake cylinder pressure and adapted to operate to connect the service chamber to the brake pipe when there is an excess of pressure in said service chamber after a service application of the brakes, said means also operating to connect the brake pipe to the brake cylinder when the pressure in the brake cylinder is below the desired pressure for a service application of the brakes.

15. An air brake apparatus of the Kunze Knorr type, comprising a quick release valve, a quick release reservoir, and means operating upon an increase of brake pipe pressure to open said quick release valve and thereby connect the quick release reservoir to the brake pipe.

16. An air brake apparatus of the Kunze Knorr type, comprising a quick release valve, a quick release reservoir, means operating upon an increase in brake pipe pressure to open the quick release valve and thereby connect the quick release reservoir to the brake pipe, a graduated release valve, a manually operable release governing valve having a quick release position and a graduated release position, means whereby the release governing valve in its quick release position will permit the quick release valve to operate, means whereby the release governing valve in its graduated release position will prevent the quick release valve operating, and means whereby when the release governing valve is in graduated release position the graduated release valve will control the release of brake cylinder pressure.

17. An air brake apparatus of the Kunze Knorr type, comprising a quick release valve, a quick release reservoir, means operating upon an increase of brake pipe pressure to open said quick release valve and thereby connect the quick release reservoir to the brake pipe, a graduated release valve, and a manually operable release governing valve having two positions, said release governing valve in one position rendering the quick release valve ineffective and in its other position rendering the graduated release valve ineffective.

18. An air brake apparatus of the Kunze Knorr type, comprising a main slide valve, a quick release valve, a quick release reservoir, and means adapted to operate when the main slide valve is in release position to open said quick release valve and thereby connect the quick release reservoir to the brake pipe.

19. An air brake apparatus of the Kunze Knorr type, comprising a main slide valve, a quick release valve, a quick release reservoir, and means adapted to operate when the main slide valve is in release position to open the quick release valve for a predetermined period to permit air to flow from the quick release reservoir to the brake pipe.

20. An air brake apparatus of the Kunze Knorr type, comprising a single chamber brake cylinder, a double chamber brake cylinder, a movable piston in the double chamber cylinder dividing said cylinder into a service chamber and an emergency chamber, main and graduating slide valves, operating pistons connected thereto, an application valve provided with a control chamber and a brake cylinder pressure chamber, means operating upon a reduction of brake pipe pressure to connect an air supply to the control chamber of the application valve to build up a pressure in the control chamber in direct ratio to the brake pipe reduction, means whereby the pressure in the control chamber will open the said application valve to permit air to flow from the service chamber of the double chamber cylinder into the brake cylinder pressure chamber of the application valve and into the single chamber brake cylinder, means whereby when the pressure in the brake cylinder pressure chamber of the application valve equals the pressure in the control chamber the application valve will close, and means adapted to operate when the graduating valve is in service lap position and the brake cylinder pressure leaks down below the desired pressure to connect the brake pipe to the brake cylinder to build up the desired brake cylinder pressure.

21. An air brake apparatus of the Kunze Knorr type, comprising a single chamber brake cylinder, a double chamber brake cylinder, a movable piston in the double chamber cylinder dividing said cylinder into a service chamber and an emergency chamber, main and graduating slide valves, operating pistons connected thereto, an application valve provided with a control chamber and a brake cylinder pressure chamber, means operating upon a reduction of brake pipe pressure to connect an air supply to the control chamber of the application valve to build up a pressure in the control chamber in direct ratio to the brake pipe reduction, means whereby the pressure in the control chamber will open the said application valve to permit air to flow from the service chamber of the double chamber cylinder into the brake cylinder pressure chamber of the application valve and into the single chamber brake cylinder, means whereby when the pressure in the brake cylinder pressure chamber of the application valve equals the pressure in the control chamber the application valve will close, means adapted to operate to connect the brake pipe to the brake cylinder to build up the desired brake cylinder pressure with the graduating valve in service lap position and the brake cylinder pressure reduced below the desired pressure, a release valve to control the release of brake cylinder pressure, means whereby said release valve will be controlled by the pressure in the control chamber and in the brake cylinder pressure chamber, and means whereby the main slide valve in release position will control the flow of brake cylinder pressure from the release valve to atmosphere.

22. An air brake apparatus of the Kunze Knorr type, comprising a single chamber brake cylinder, a double chamber brake cylinder, a movable piston in the double chamber cylinder dividing said cylinder into a service chamber and an emergency chamber, main and graduating slide valves, operating pistons connected thereto, an application valve provided with a control chamber and a brake cylinder pressure chamber, means operating upon a reduction of brake pipe pressure to connect an air supply to the control chamber of the application valve to build up a pressure in the control chamber in direct ratio to the brake pipe reduction, means whereby the pressure in the control chamber will open the said application valve to permit air to flow from the service chamber of the double chamber cylinder into the brake cylinder pressure chamber of the application valve and into the single chamber brake cylinder, means whereby when the pressure in the brake cylinder pressure chamber of the application valve equals the pressure in the control chamber the application valve will close, means adapted to operate to connect the brake pipe to the brake cylinder to build up the desired brake cylinder pressure with the graduating valve in service lap position and the brake cylinder pressure reduced below the desired pressure, a release valve to control the release of brake cylinder pressure, means whereby said release valve will be controlled by the pressure in the control chamber and in the brake cylinder pressure chamber, means whereby the main slide valve in release position will control the flow of brake cylinder pressure from the release valve to atmosphere, and means whereby the main slide valve in release position will connect the control chamber to atmosphere.

23. An air brake apparatus of the Kunze Knorr type, comprising a single chamber brake cylinder, a double chamber brake cylinder, a movable piston in the double chamber cylinder dividing said cylinder into a service chamber and an emergency chamber, main and graduating slide valves, operating pistons connected thereto, an application valve provided with a control chamber and a brake cylinder pressure chamber, means operating upon a reduction of brake pipe pressure to connect an air supply to the control chamber of the application valve to build up a pressure in the control chamber in direct ratio to the brake pipe reduction, means whereby the pressure in the control chamber will open the said application valve to permit air to flow from the service chamber of the double chamber cylinder into the brake cylinder pressure chamber of the application valve and into the single chamber brake cylinder, means whereby when the pressure in the brake cylinder pressure chamber of the application valve equals the pressure in the control chamber the application valve will close, means adapted to operate to connect the brake pipe to the brake cylinder to build up the desired brake cylinder pressure with the graduating valve in service lap position and the brake cylinder pressure reduced below the desired pressure, a release valve to control the release of brake cylinder pressure, means whereby said release valve will be controlled by the pressure in the control chamber and in the brake cylinder pressure chamber, means whereby the main slide valve in release position will control the flow of brake cylinder pressure from the release valve to atmosphere, means whereby the main slide valve in release position will connect the control chamber to atmosphere, a release governing valve adapted to be opened for quick release operations and to be closed for graduated release operations and controlling the flow of brake cylinder pressure and control chamber air from the main slide valve to atmosphere, a graduated release valve controlling the flow of brake cylinder pressure and control chamber air to atmosphere when the release governing valve is closed.

24. An air brake apparatus of the Kunze Knorr type, comprising a main slide valve, adapted to be moved to release position upon an increase in brake pipe pressure, a brake cylinder pressure release valve, means whereby said release valve will be moved to release position when the main slide valve is in release position, means whereby the main slide valve in release position will control the flow of brake cylinder pressure from the said release valve, a release governing valve controlling the flow of brake cylinder pressure from the main slide valve to atmosphere and adapted to be opened for quick release operations and closed for graduated release operations, and a graduated release valve controlling the flow of brake cylinder pressure from the main slide valve to atmosphere when the release governing valve is closed.

25. An air brake apparatus of the Kunze Knorr type, comprising a main slide valve, adapted to be moved to release position upon an increase in brake pipe pressure, a brake cylinder pressure release valve, means whereby said release valve will be moved to release position when the main slide valve in release position will control the flow of brake cylinder pressure from the said release valve, a release governing valve controlling the flow of brake cylinder pressure from the main slide valve to atmosphere and adapted to be opened for quick release operations and closed for graduated release operations, a graduated release valve controlling the flow of brake cylinder pressure from the main slide valve to atmosphere when the release governing valve is closed, a quick release valve, a quick release reservoir, and means adapted to operate when the release governing valve is open and the main slide valve is in release position to open the quick release valve and thereby permit air to flow from the quick release reservoir to the brake pipe.

26. An air brake apparatus of the Kunze Knorr type, comprising a main slide valve, adapted to be moved to release position upon an increase in brake pipe pressure, a brake cylinder pressure release valve, means whereby said release valve will be moved to release position when the main slide valve in release position will control the flow of brake cylinder pressure from the said release valve, a release governing valve controlling the flow of brake cylinder pressure from the main slide valve to atmosphere and adapted to be opened for quick release operations and closed for graduated release operations, a graduated release valve controlling the flow of brake cylinder pressure from the main slide valve to atmosphere when the release governing valve is closed, a quick release valve, a quick release reservoir, means adapted to operate when the release governing valve is open and the main slide valve is in release position to open the quick release valve and thereby permit air to flow from the quick release reservoir to the brake pipe, and means rendering the quick release valve ineffective when the release governing valve is closed.

27. An air brake apparatus of the Kunze Knorr type, and provided with a graduated release valve mechanism having an actuating chamber, a brake cylinder pressure chamber and a constant pressure chamber, means whereby the pressures in the actuating chamber and in the brake cylinder pressure chamber will oppose the pressure in the constant pressure chamber, means for admitting pressure from the emergency chamber of the double chamber cylinder into the actuating chamber, means operating upon an increase of brake pipe pressure to place the brake cylinder in communication with the brake cylinder pressure chamber whereby said brake cylinder pressure will assist the emergency chamber pressure in opposing the substantially constant pressure and will move the graduated release valve to release position, and means whereby said valve in release position will connect the brake cylinder pressure chamber to atmosphere.

28. An air brake apparatus of the Kunze Knorr type, and provided with a graduated release valve mechanism having an actuating chamber, a brake cylinder pressure chamber and a constant pressure chamber, means whereby the pressures in the actuating chamber and in the brake cylinder pressure chamber will oppose the pressure in the constant pressure chamber, means for admitting a variable pressure into the actuating chamber, means operating upon an increase of brake pipe pressure to place the brake cylinder in communication with the brake cylinder pressure chamber whereby said brake cylinder pressure will assist the pressure in the actuating chamber in opposing the substantially constant pressure and will move the graduated release valve to release position, and means whereby said valve in release position will connect the said brake cylinder pressure chamber to atmosphere.

29. An air brake apparatus of the Kunze Knorr type, and provided with a graduated-release valve mechanism having an actuating chamber, a brake cylinder pressure chamber and a constant pressure chamber, an actuating diaphragm between the actuating chamber and the brake cylinder pressure chamber, an equalizing diaphragm forming one wall of the brake cylinder pressure chamber, a release diaphragm forming one wall of the constant pressure chamber, the equalizing diaphragm being larger in area than the actuating diaphragm and the release diaphragm, means for admitting pressure from the emergency chamber of the double-chamber cylinder into the actuating chamber, means operating upon an increase of brake pipe pressure to place the brake cylinder in communication with the brake cylinder pressure chamber whereby the brake cylinder pressure will assist the actuating chamber pressure in opposing the substantially constant pressure and will move the graduated-release valve to release position, and means whereby said valve in release position will connect the said brake cylinder pressure chamber to atmosphere.

30. An air brake apparatus of the Kunze Knorr type, and provided with a graduated-release valve mechanism having an actuating chamber, a brake cylinder pressure chamber, a retention chamber, and a constant pressure chamber, an actuating diaphragm between the actuating chamber and the brake cylinder pressure chamber, an equalizing diaphragm between the retention chamber and the brake cylinder pressure chamber, a release diaphragm between the retention chamber and the constant pressure chamber, the equalizing diaphragm being larger in area than the actuating diaphragm and the release diaphragm, means for admitting pressure from the emergency chamber of the double-chamber cylinder into the actuating chamber, means operating upon an increase of brake pipe pressure to place the brake cylinder in communication with the brake cylinder pressure chamber whereby the brake cylinder pressure will assist the actuating chamber pressure in opposing the substantially constant pressure and will move the graduated-release valve to release position, and means whereby said valve in release position will connect the said brake cylinder pressure chamber to atmosphere and to the retention chamber through a restricted port.

31. An air brake apparatus of the Kunze Knorr type, comprising a single-chamber brake cylinder, a double-chamber brake cylinder, a movable piston in the double-chamber cylinder dividing said cylinder into a service chamber and an emergency chamber, a main slide valve, a graduating valve movable to service lap position, means operating upon a reduction of brake pipe pressure to connect the said service chamber to the single-chamber brake cylinder to build up in said brake cylinder a pressure at a predetermined ratio to the brake pipe reduction without regard to the length of brake cylinder piston travel, and means adapted to operate to connect the brake pipe to the brake cylinder to build up the desired brake cylinder pressure with the graduating valve in service lap position and the brake cylinder pressure reduced below the desired pressure.

32. An air brake apparatus of the Kunze Knorr type, comprising a single-chamber brake cylinder, a double-chamber brake cylinder, a movable piston in the double-chamber cylinder dividing said cylinder into a service chamber and an emergency chamber, a main slide valve, a graduating valve movable to service lap position, means operating upon a reduction of brake pipe pressure to connect the said service chamber to the single-chamber brake cylinder, and means adapted to operate to connect the brake pipe to the brake cylinder with the graduating valve in service lap position to compensate for brake cylinder leakage.

33. An air brake apparatus of the Kunze Knorr type, comprising a single-chamber brake cylinder, a double-chamber brake cylinder, a movable piston in the double-chamber cylinder dividing said cylinder into a service chamber and an emergency chamber, means operating upon a reduction of brake pipe pressure to connect the said service chamber to the single-chamber brake cylinder, a normally closed quick-service valve, means operating upon a reduction of brake pipe pressure to admit brake pipe air to open said quick-service valve, means whereby brake pipe air may flow from the quick-service valve to the brake cylinder, and means whereby the brake cylinder pressure will close the quick-service valve.

34. An air brake apparatus of the Kunze Knorr type, comprising a single-chamber brake cylinder, a double-chamber brake cylinder, a movable piston in the double-chamber cylinder dividing said cylinder into a service chamber and an emergency chamber, means operating upon a reduction of brake pipe pressure to connect the said service chamber to the single-chamber brake cylinder, a normally closed quick-service valve, means operating upon a reduction of brake pipe pressure to admit brake pipe air to open said quick-service valve, means whereby brake pipe air may flow from the quick-service valve to the brake cylinder, and means whereby a low pressure in the brake cylinder will close the quick-service valve.

35. An air brake apparatus comprising a single-chamber brake cylinder, a double-chamber brake cylinder, a movable piston in the double-chamber cylinder dividing said cylinder into a service chamber and an emergency chamber, main and graduating slide valves, operating pistons connected thereo, an application valve provided with a control chamber and a brake cylinder pressure chamber, an emergency valve, a volume chamber connected to the emergency valve chamber, means whereby the emergency valve in service position and the main and graduating valves in service position will connect the emergency valve chamber and the volume chamber to the control chamber of the application valve to build up a pressure in the control chamber in direct ratio to the brake pipe reduction, means whereby the pressure in the control chamber will open the application valve to permit air to flow from the service chamber of the double-chamber brake cylinder through the application valve into the brake cylinder pressure chamber of the application valve and from said chamber to the single-chamber brake cylinder, means whereby when the pressure in the brake cylinder chamber of the application valve equals the pressure in the control chamber the application valve will close, means whereby the emergency valve will move to emergency position in response to an emergency reduction of brake pipe pressure, means whereby the emergency valve in moving to emergency position will open an emergency check valve and permit air to flow from the service chamber to the emergency valve chamber, an emergency brake pipe vent valve, means adapted to open said vent valve when the emergency valve is in emergency position, an equalizing valve operating upon an emergency reduction of brake pipe pressure to connect the emergency valve chamber to the brake pipe, and means to automatically close the emergency brake pipe vent valve.

36. An air brake apparatus of the Kunze Knorr type, comprising a single-chamber brake cylinder, a double-chamber brake cylinder, a movable piston in the double-chamber cylinder dividing said cylinder into a service chamber and an emergency chamber, means operating upon a reduction of brake pipe pressure to connect the said service chamber to the single-chamber brake cylinder, an emergency valve, means whereby the emergency valve will move to emergency position in response to an emergency reduction of brake pipe pressure, means whereby the emergency valve in moving to emergency position will open an emergency check valve and permit air to flow from the service chamber to the emergency valve chamber, an emergency brake pipe vent valve, means adapted to open said vent valve when the emergency valve is in emergency position, an equalizing valve operating upon an emergency reduction of brake pipe pressure to connect the emrgency valve chamber to the brake pipe, and means to automatically close the emergency brake pipe vent valve.

37. An air brake apparatus of the Kunze Knorr type, comprising a single-chamber brake cylinder, a double-chamber brake cylinder, a movable piston in the double-chamber cylinder dividing said cylinder into a service chamber and an emergency chamber, means operating upon a reduction of brake pipe pressure to connect the said service chamber to the single-chamber brake cylinder, an emergency valve, means whereby the emergency valve will move to emergency position in response to an emergency reduction of brake pipe pressure, an emergency brake pipe vent valve, means adapted to open said vent valve when the emergency valve is in emergency position, and means to automatically close the emergency brake pipe vent valve.

38. An air brake apparatus of the Kunze Knorr type, comprising a single-chamber brake cylinder, a double-chamber brake cylinder, a movable piston in the double-chamber cylinder dividing said cylinder into a service chamber and an emergency chamber, means operating upon a reduction of brake pipe pressure to connect the said service chamber to the single-chamber brake cylinder to build up in said brake cylinder a pressure at a predetermined ratio to the brake pipe reduction without regard to the length of brake cylinder piston travel, and means operated by rapid decreases of and increases in brake pipe pressure to build up the brake cylinder pressure at a higher ratio than the predetermined ratio.

39. In an air brake apparatus of the Kunze Knorr type, means operated by rapid decreases of and increases in brake pipe pressure to build up the brake cylinder pressure.

40. In an air brake apparatus of the Kunze Knorr type, and means automatically operated by rapid decreases and increases in brake pipe pressure to build up the brake cylinder pressure.

41. An air brake apparatus of the Kunze Knorr type, comprising a single chamber brake cylinder, a double chamber brake cylinder, a movable piston in the double chamber cylinder dividing said cylinder into a service chamber and an emergency chamber, means operating upon a reduction of brake pipe pressure to connect the said service chamber to the single chamber brake cylinder to build up in said brake cylinder a pressure at a predetermined ratio to the brake pipe reduction without regard to the length of brake cylinder piston travel, and means operating upon a predetermined increase of brake pipe pressure to reduce the brake cylinder pressure at a predetermined ratio to the increase of brake pipe pressure.

42. An air brake apparatus of the Kunze Knorr type, comprising a single chamber brake cylinder, a double chamber brake cylinder, a movable piston in the double chamber cylinder dividing said cylinder into a service chamber and an emergency chamber, means operating upon a reduction of brake pipe pressure to connect the said service chamber to the single chamber brake cylinder to build up in said brake cylinder a pressure at a predetermined ratio to the brake pipe reduction without regard to the length of brake cylinder piston travel, and means operating upon a predetermined increase of pressure in the said emergency chamber to reduce the brake cylinder pressure at a predetermined ratio to the increase of emergency chamber pressure.

43. An air brake apparatus of the Kunze Knorr type, comprising a single-chamber brake cylinder, a double-chamber brake cylinder, a movable piston in the double-chamber cylinder dividing said cylinder into a service chamber and an emergency chamber, a main slide valve, a graduating valve movable to service lap position, means whereby a normal increase in brake pipe pressure will move the main slide valve to normal charging and normal release position, means whereby an excessive brake pipe pressure will move the main slide valve to retarded-recharging and restricted-release position, means whereby the main slide valve in retarded-recharging position will permit air to flow slowly from the main valve chamber to the service chamber of the double-chamber cylinder, and means whereby the main slide valve in retarded-recharging position will restrict the flow of air from the brake cylinder to atmosphere.

44. An air brake apparatus of the Kunze Knorr type, comprising a single-chamber brake cylinder, a double-chamber brake cylinder, a movable piston in the double-chamber cylinder dividing said cylinder into a service chamber and an emergency chamber, a main slide valve, a graduating valve movable to service lap position, and means operating upon an excess of brake pipe pressure to slowly recharge the service chamber of the double-chamber cylinder and restrict the release of brake cylinder pressure.

In testimony whereof I hereunto affix my signature.

WILLIAM ASTLE.